(12) United States Patent
Han et al.

(10) Patent No.: US 10,397,016 B2
(45) Date of Patent: Aug. 27, 2019

(54) MOBILE TERMINAL AND ARTIFICIAL INTELLIGENCE HOME APPLIANCE

(71) Applicant: LG ELECTRONICS INC., Seoul (KR)

(72) Inventors: Dongwoo Han, Seoul (KR); Heejung Seo, Seoul (KR); Seunghyuck Kang, Seoul (KR); Kyuyeol Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 270 days.

(21) Appl. No.: 15/261,200

(22) Filed: Sep. 9, 2016

(65) Prior Publication Data

US 2017/0078110 A1 Mar. 16, 2017

(30) Foreign Application Priority Data

Sep. 11, 2015 (KR) ........................ 10-2015-0129287

(51) Int. Cl.
*H04L 12/28* (2006.01)
*H04L 29/08* (2006.01)
(Continued)

(52) U.S. Cl.
CPC ........ *H04L 12/2823* (2013.01); *G05B 19/409* (2013.01); *G05B 19/4065* (2013.01);
(Continued)

(58) Field of Classification Search
CPC ............. H04L 12/2823; H04L 12/2803; H04L 12/2809; H04L 12/282; H04L 12/2838;
(Continued)

(56) References Cited

U.S. PATENT DOCUMENTS

| 2001/0041982 | A1* | 11/2001 | Kawasaki | G10L 15/26 704/275 |
| 2003/0076240 | A1* | 4/2003 | Bae | G05B 19/0426 340/12.5 |

(Continued)

FOREIGN PATENT DOCUMENTS

| CN | 201797521 U | 4/2011 |
| CN | 102388574 A | 3/2012 |

(Continued)

*Primary Examiner* — Uzma Alam
(74) *Attorney, Agent, or Firm* — Dentons US LLP

(57) ABSTRACT

A mobile terminal includes a display, a communication unit, a microphone, and a controller configured to perform a control operation to transmit a request for management data to an artificial Intelligence home appliance through the communication unit according to a management mode input and to display a management data screen on the display based on first sound acquired from the home appliance, and perform a control operation to transmit a request for diagnostic data to the home appliance through the communication unit according to a diagnosis mode input and to display a diagnostic data screen on the display based on second sound acquired from the home appliance. The management data screen and diagnostic data screen may be easily displayed based on the sound output from the home appliance.

8 Claims, 21 Drawing Sheets

(51) Int. Cl.
*H04L 12/24* (2006.01)
*H04B 17/318* (2015.01)
*G05B 19/4065* (2006.01)
*G05B 19/409* (2006.01)
*H04L 29/14* (2006.01)

(52) U.S. Cl.
CPC ......... *H04B 17/318* (2015.01); *H04L 12/282* (2013.01); *H04L 12/2803* (2013.01); *H04L 12/2809* (2013.01); *H04L 12/2838* (2013.01); *H04L 41/22* (2013.01); *H04L 67/12* (2013.01); *H04L 69/40* (2013.01); *G05B 2219/2642* (2013.01); *H04L 2012/2841* (2013.01)

(58) Field of Classification Search
CPC ......... H04L 41/22; H04L 67/12; H04L 69/40; H05B 17/318; G05B 19/4065; G05B 19/409
See application file for complete search history.

(56) References Cited

U.S. PATENT DOCUMENTS

| | | | |
|---|---|---|---|
| 2006/0185373 A1 | 8/2006 | Butler et al. | |
| 2008/0041267 A1* | 2/2008 | Denen | A63H 19/02 105/1.5 |
| 2008/0108388 A1* | 5/2008 | Ebrom | D06F 39/005 455/557 |
| 2012/0020487 A1* | 1/2012 | Fried | H03G 3/301 381/58 |
| 2012/0051187 A1 | 3/2012 | Paulson | |
| 2014/0300447 A1* | 10/2014 | Ha | H04Q 9/00 340/5.61 |
| 2014/0304110 A1* | 10/2014 | Rimnac, Jr. | G06Q 30/0633 705/26.8 |
| 2015/0023524 A1* | 1/2015 | Shigenaga | H04R 1/326 381/92 |
| 2015/0079903 A1* | 3/2015 | Song | G06K 7/10217 455/41.1 |
| 2015/0350413 A1* | 12/2015 | Ma | H04M 1/72577 455/418 |
| 2016/0034251 A1* | 2/2016 | Sendai | G06F 3/167 345/156 |
| 2016/0226676 A1* | 8/2016 | Shin | H04B 11/00 |
| 2016/0253146 A1* | 9/2016 | Yang | H04N 5/60 381/107 |
| 2016/0301373 A1* | 10/2016 | Herman | H03G 3/3005 |

FOREIGN PATENT DOCUMENTS

| | | | | |
|---|---|---|---|---|
| CN | 102915004 A | 2/2013 | | |
| CN | 103053136 A | 4/2013 | | |
| CN | 103283183 A | 9/2013 | | |
| CN | 103364655 A | 10/2013 | | |
| CN | 103532801 A | 1/2014 | | |
| CN | 103543698 A | 1/2014 | | |
| CN | 104102142 A | 10/2014 | | |
| EP | 2648393 A1 * | 10/2013 | | G06F 11/1415 |
| KR | 10-2011-0010375 A | 2/2011 | | |
| KR | 10-2012-0075555 A | 7/2012 | | |
| KR | 10-2015-0031695 A | 3/2015 | | |
| WO | 2015/037963 A1 | 3/2015 | | |

* cited by examiner

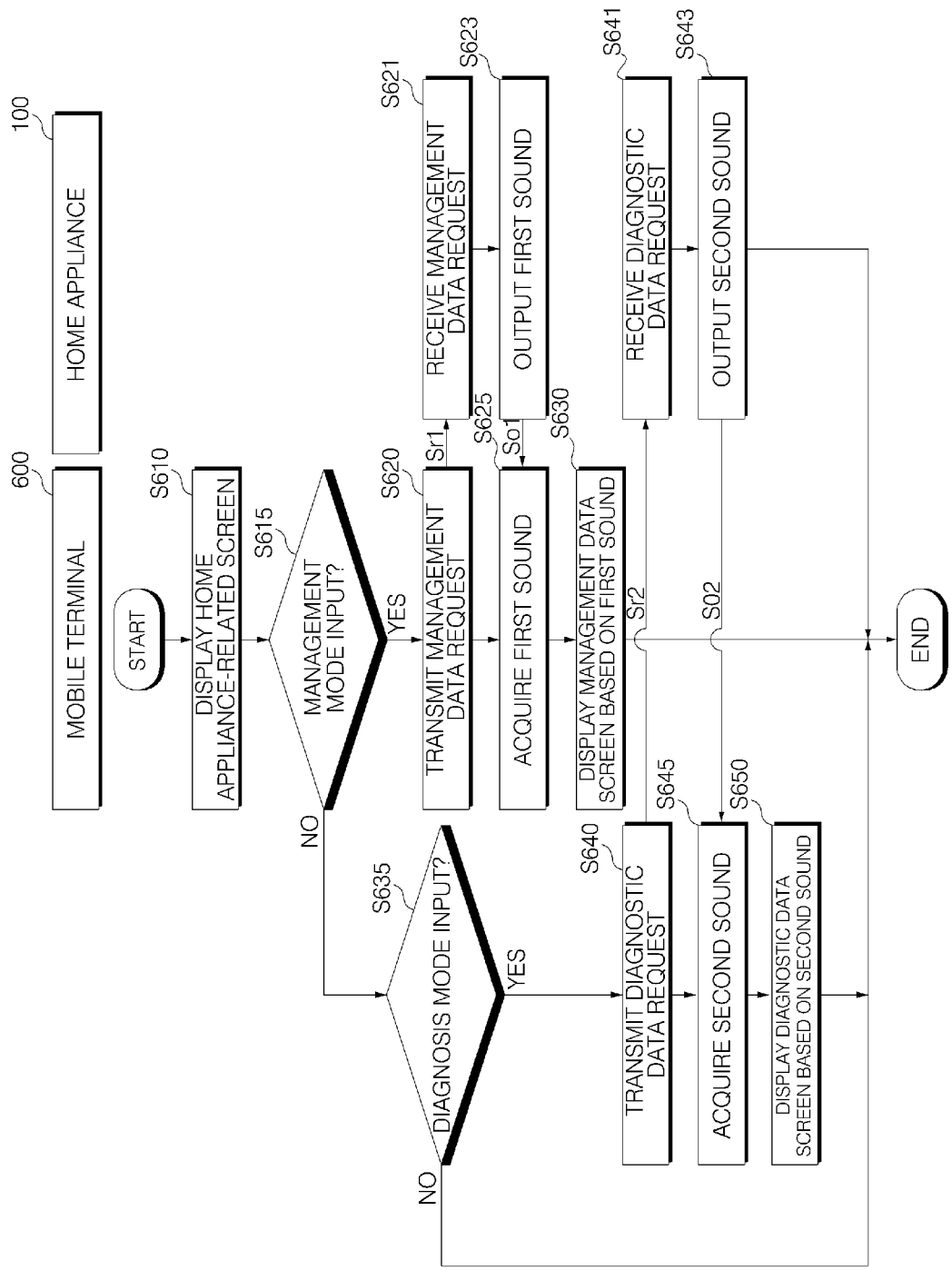

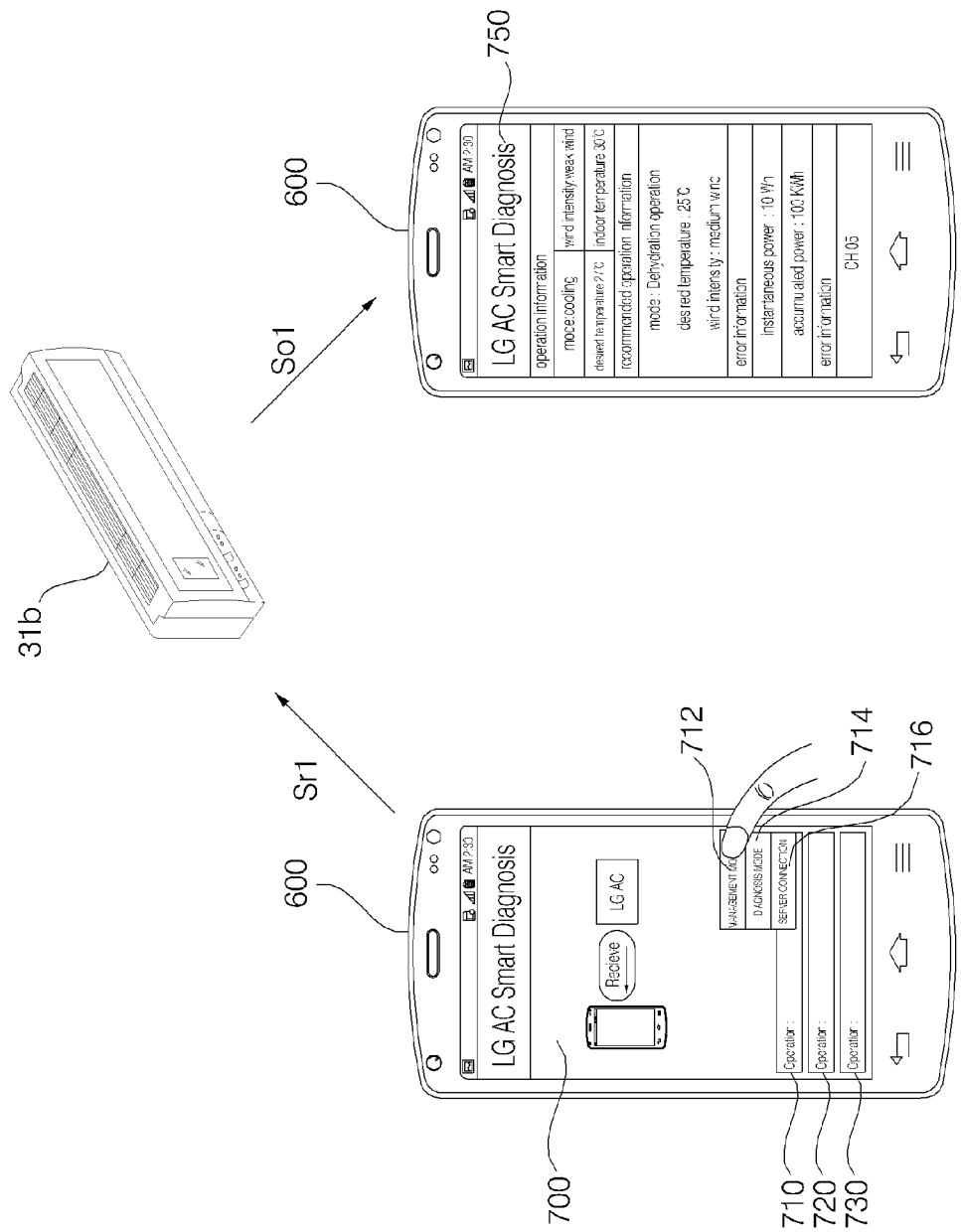

MOBILE TERMINAL AND ARTIFICIAL INTELLIGENCE HOME APPLIANCE

CROSS-REFERENCE TO RELATED APPLICATION

This application claims the priority benefit of Korean Patent Application No. 10-2015-0129287, filed on Sep. 11, 2015 in the Korean Intellectual Property Office, the disclosure of which is incorporated herein by reference.

BACKGROUND

1. Field of the Disclosure

The present disclosure relates to a mobile terminal and a home appliance and, more particularly, to a mobile terminal capable of easily displaying a management data screen and a diagnostic data screen based on sound output from a home appliance, and a home appliance.

2. Background

Home appliances such as a refrigerator, a washing machine, an air conditioner, etc., are disposed in a building to perform corresponding operations.

With development of various communication schemes, various methods to enhance user convenience through communication have been studied for home appliances. Particularly, research has been conducted on a method of easily implementing fault diagnosis of home appliances.

SUMMARY

Therefore, the present disclosure has been made in view of the above problems, and one object is to provide a mobile terminal capable of easily displaying a management data screen and a diagnostic data screen based on sound output from a home appliance, and a home appliance providing sound data output.

In accordance with an aspect, the above and other objects may be accomplished by the provision of a mobile terminal including a display, a communication unit, a microphone, and a controller configured to perform a control operation to transmit a request for management data to a home appliance through the communication unit based on a management mode input and to display a management data screen on the display based on first sound acquired from the home appliance, and perform a control operation to transmit a request for diagnostic data to the home appliance through the communication unit based on a diagnosis mode input and to display a diagnostic data screen on the display based on second sound acquired from the home appliance.

In accordance with another aspect, there is provided a mobile terminal including a display, a communication unit, a microphone, and a controller configured to perform a control operation to display a home appliance-related screen and to display, when a management mode item is selected in the home appliance-related screen, a management data screen on the display based on first sound acquired from a home appliance, and to display, when a diagnosis mode item is selected in the home appliance-related screen, a diagnostic data screen on the display based on second sound acquired from the home appliance.

In accordance with another aspect, there is provided a home appliance including a memory to store diagnostic data, a communication unit to exchange data with a mobile terminal, a sound output unit, a controller to control the sound output unit to output first sound corresponding to management data when a request for the management data is received by the communication unit and to output second sound corresponding to diagnostic data when a request for the diagnostic data is received by the communication unit.

BRIEF DESCRIPTION OF THE DRAWINGS

The above and other objects, features and other advantages will be more clearly understood from the following detailed description taken in conjunction with the accompanying drawings, in which:

FIG. 6 is a flowchart illustrating a method for operating a mobile terminal and a home appliance according to an embodiment of the present invention;

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers may be used throughout the drawings to refer to the same or like parts.

As used herein, the suffixes "module" and "unit" are added or used interchangeably to facilitate preparation of this specification and are not intended to suggest distinct meanings or functions. Accordingly, the terms "module" and "unit" may be used interchangeably. The terms "module" and "unit" may refer to electrical circuitry or computer instructions executed by a microprocessor or electrical logic circuitry. The term "controller" may refer to a microprocessor or an electrical logic circuitry.

A home appliance 100 according to an embodiment of the present invention may correspond to a laundry treating appliance, an air conditioner, a refrigerator, a water purifier, a cleaner, a TV, a vehicle, a robot a drone, etc.

Figure 1:
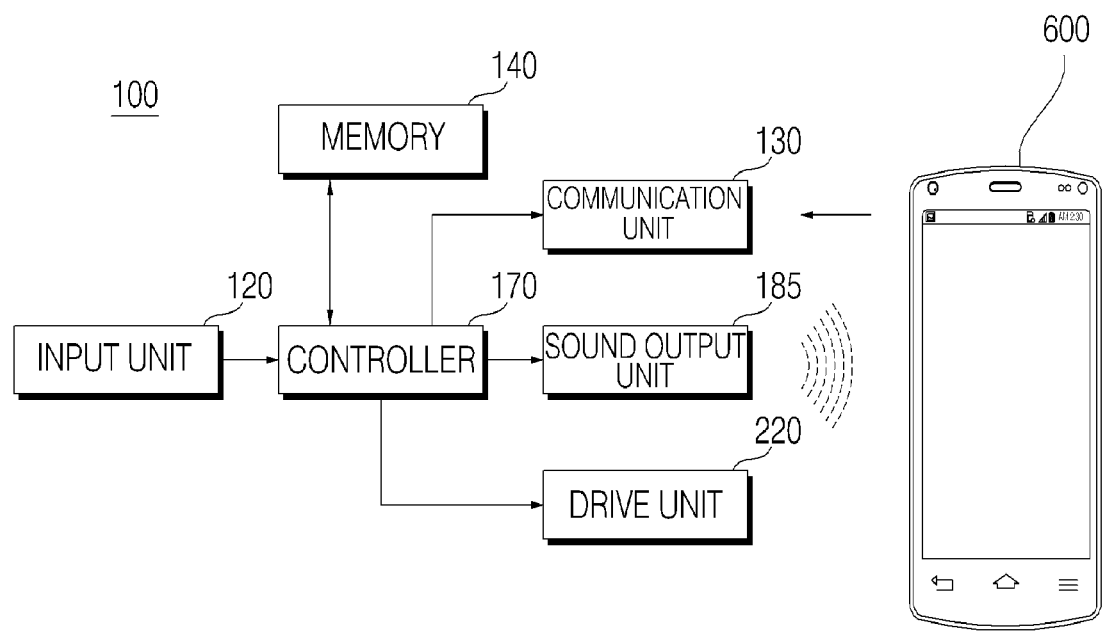
FIG. 1 is an internal block diagram illustrating a home appliance according to an embodiment of the present invention.

FIG. 1 is an internal block diagram illustrating a home appliance according to an embodiment of the present invention.

The home appliance 100 may include an input unit 120, a communication unit 130, a memory 140, a controller 170, a sound output unit 185 and a drive unit 220.

The input unit 120 as an example may include a manipulation button and a key, and output an input signal for power on/off and operation setting of the home appliance 100.

The communication unit 130 may exchange data with a peripheral device, for example, a remote controller or a mobile terminal 600 by wire or wirelessly. For example, the communication unit 113 may perform infrared (IR) communication, radio frequency (RF) communication, Bluetooth communication, ZigBee communication, Wi-Fi communication, and the like.

The controller 670 of the mobile terminal 600 (see FIG. 5) may perform a control operation to display a home appliance-related screen based on user input. When a management mode input is provided with the home appliance-related screen displayed, the controller 670 may perform a control operation to transmit a management data request using an IR signal-based first remote control signal. When a diagnosis mode input is provided, the controller 670 may perform a control operation to transmit a diagnostic data request using an IR signal-based second remote control signal.

Thereby, the communication unit 130 of the home appliance 100 may receive the management data request or diagnostic data request, and the controller 170 of the home appliance 100 may perform a control operation to output first sound corresponding to the management data stored in the memory 140 or second sound corresponding to the diagnostic data through the sound output unit 185.

A microphone 623 of the mobile terminal 600 (see FIG. 5) may receive the sound output from the sound output unit 185 of the home appliance 100, and deliver the same to the controller 670.

The controller 670 of the mobile terminal 600 may extract the diagnostic data or management data of the home appliance 100 from the first sound or second sound from the home appliance 100, and perform a control operation to display a management data screen or diagnostic data screen. Thereby, the management data screen or diagnostic data screen may be easily displayed.

The management data request or diagnostic data request from the mobile terminal 600 may be transmitted in a manner of wireless communication or IR signal-based communication.

Data transmission from the home appliance 100 may be performed in a manner of outputting sound. Thereby, data may be easily transmitted to the mobile terminal 600 using the sound output unit 185 of the home appliance 100.

The memory 140 of the home appliance 100 may store data necessary for operation of the home appliance 100. For example, the memory 140 may store data such as the operation time and operation mode of the drive unit 220.

The memory 140 of the home appliance 100 may store management data including power consumption information about the home appliance, recommended operation information, current operation information and product management information.

The memory 140 of the home appliance 100 may also store diagnostic data including operation information, driving information and error information about the home appliance.

The diagnostic data may include information indicating whether or not an error occurs, error information and temperature information, and may conceptually include at least one of discharge temperature information about a compressor, outdoor fan speed information, indoor fan operation mode information, information about an electrical current in the drive unit, and voltage information.

The controller 170 may control individual units of the home appliance 100. For example, the controller 170 may control the input unit 120, the communication unit 130, the memory 140, and the drive unit 220.

The controller 170 of the home appliance 100 may perform a control operation to periodically store the management data in the memory 140. When a management data request is received from the communication unit 130, the controller 170 may perform a control operation to output the first sound corresponding to the management data. Thereby, the management data may be easily transmitted to the mobile terminal 600.

According to an embodiment of the present invention, when an error occurs during an operation, the memory 140 may store diagnostic data including error occurrence time information, information about operation at the time of occurrence of the error and the state information.

In particular, the memory 140 may temporarily store the operation information and state information periodically. When an error occurs, the memory 140 may store the final operation information and final state information among the periodically and temporarily stored operation information and state information.

When an error occurs, the memory 140 may store the operation information given at the time of occurrence of the error, and store operation information or state information given a predetermined time after occurrence of the error.

When an error occurs during operation, the controller 170 of the home appliance 100 may perform a control operation to store, in the memory 140, diagnostic data including error occurrence time information, operation information at the time of occurrence of the error, and state information. When a diagnostic data request is received from the communication unit 130, the controller 170 may perform a control operation to output the second sound corresponding to the diagnostic data. Thereby, the diagnostic data may be easily transmitted to the mobile terminal 600.

Herein, the diagnostic data may include operation information, state information, operation information at the time of occurrence of the error, and operation information or state information given a predetermined time after occurrence of the error, which are periodically stored.

For example, the diagnostic data may include temperature information, discharge temperature information about the compressor, outdoor fan speed information, indoor fan operation mode information, and information indicating whether an error occurs.

The sound output unit 185 may include a speaker to output sound.

Alternatively, the sound output unit 185 may conceptually include a motor 230 in the drive unit 220 and an inverter 420.

Figure 4:
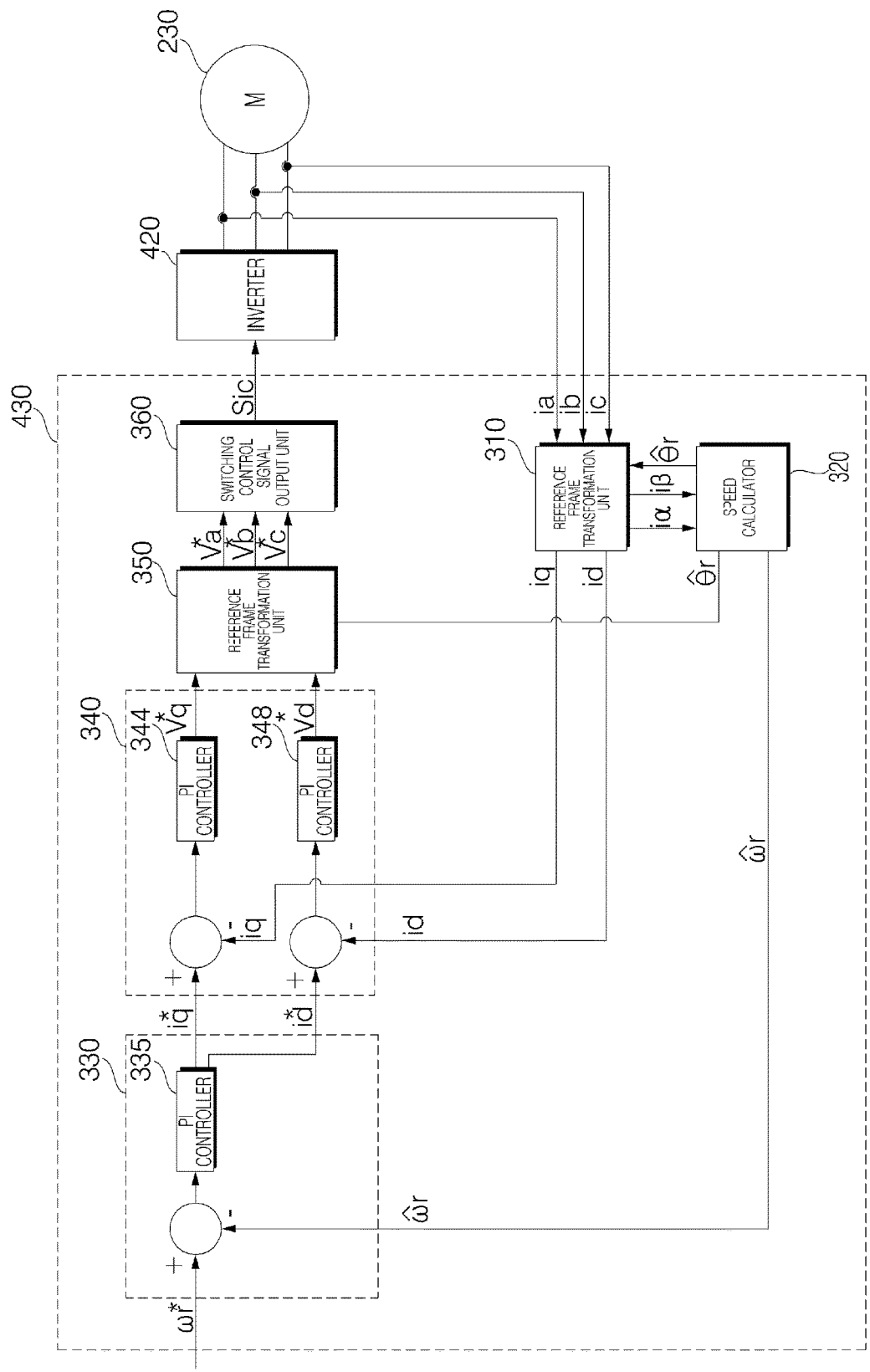
FIG. 4 is an internal block diagram illustrating the inverter controller of FIG. 3.

For example, the sound output unit 185 may include the inverter 420 (see FIG. 2) including a plurality of switching devices and configured to convert DC power to AC power according to switching operation of the switching devices and to supply the AC power to the motor 230 (see FIG. 4). In outputting sound, the controller 170 may change the switching frequency of the respective switching devices of the inverter, and perform a control operation to output sound corresponding to the changed switching frequency.

The drive unit 220 may drive the motor of the home appliance 100.

A motor driving apparatus described in this specification may be an apparatus which is not provided with a position sensor such as a Hall sensor for sensing the position of the rotor of the motor, but is capable of estimating the position of the rotor of the motor in a sensorless manner. Hereinafter, a sensorless motor driving apparatus will be described.

A motor drive unit 220 according to an embodiment of the present invention may be referred to as a motor driving apparatus 220.

Figure 2:
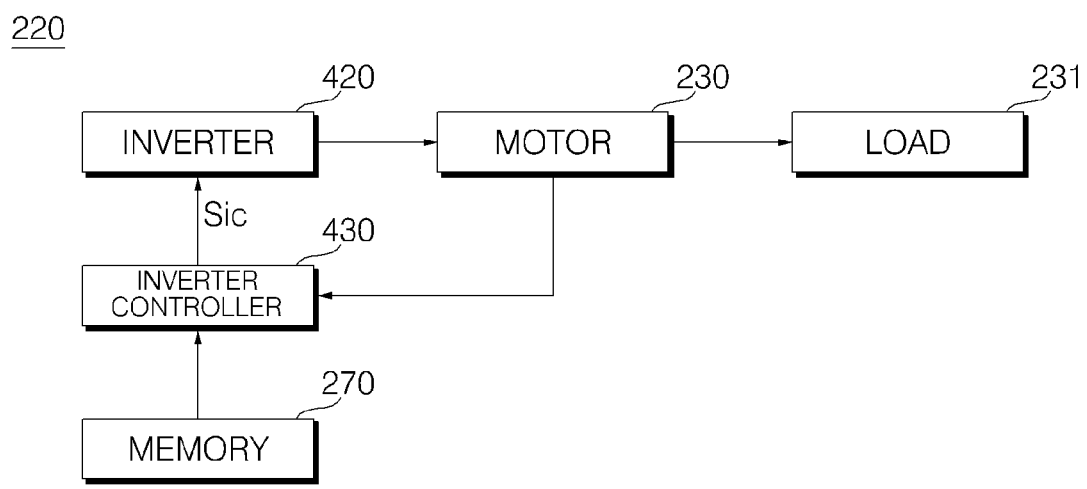
FIG. 2 is an internal block diagram illustrating the motor driving apparatus of FIG. 1.
Figure 3:
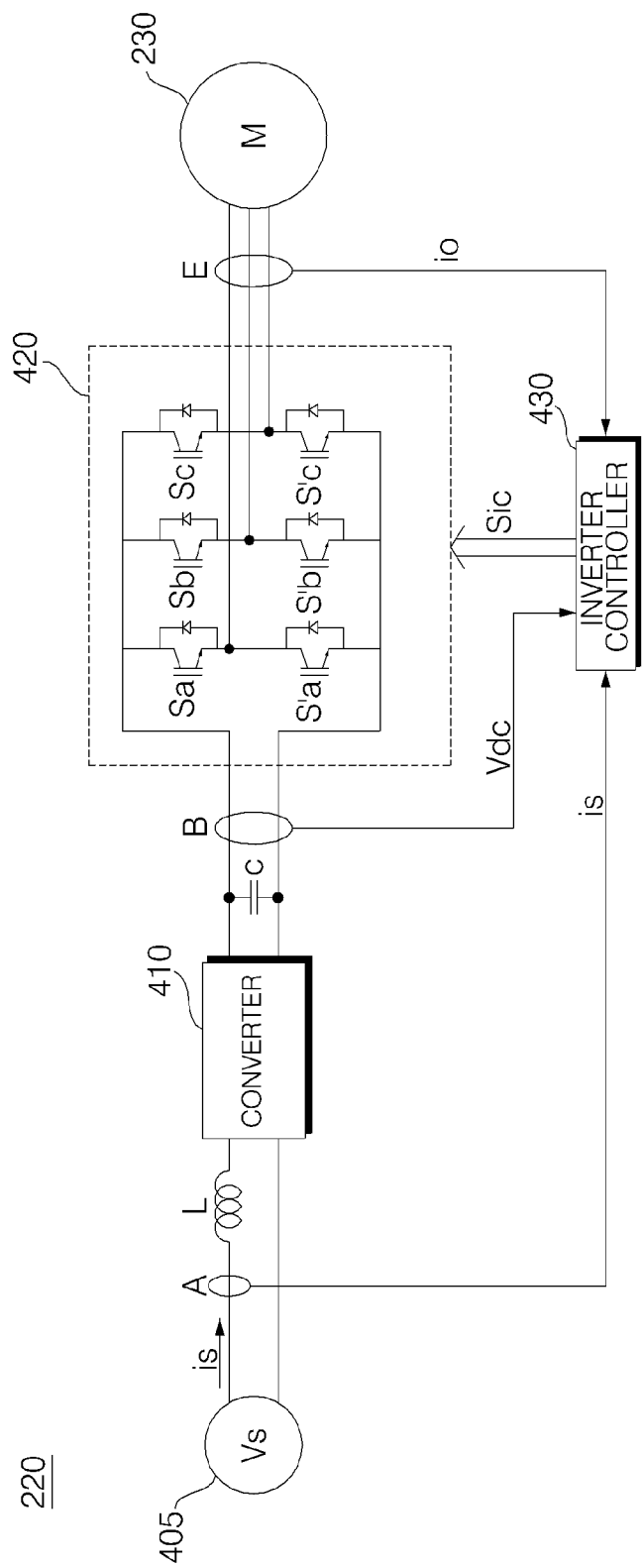
FIG. 3 is an internal circuit diagram illustrating the motor driving apparatus of FIG. 2.

FIG. 2 is an internal block diagram illustrating the motor driving apparatus of FIG. 1, and FIG. 3 is an internal circuit diagram illustrating the motor driving apparatus of FIG. 2.

Referring to FIGS. 1 and 2, the motor driving apparatus 220, which is configured to drive a motor in a sensorless manner, may include an inverter 420 and an inverter controller 430.

Referring to FIG. 3, the motor driving apparatus 220 may further include a converter 410, a DC link voltage detector B, a smoothing capacitor C, and an output current detector E. The drive unit 220 may further include an input current detector A and a reactor L.

When an error occurs during operation, the inverter controller 430 may perform a control operation to store, in the memory 140 or memory 270, diagnostic data including error occurrence time information, operation information at the time of occurrence of the error, and state information.

The inverter controller 430 may perform a control operation to temporarily store the operation information and state information in the memory 140 or memory 270 periodically. When an error occurs, the inverter controller 430 may perform a control operation to store, in the memory 140 or memory 270, the final operation information and the final state information of the periodically and temporarily stored operation information and state information.

When an error occurs, the inverter controller 430 may perform a control operation to store, in the memory 140 or memory 270, the operation information given at the time of occurrence of the error and to store, in the memory 140 or memory 270, operation information or state information given a predetermined time after occurrence of the error.

Preferably, the amount of data of the final operation information or final state information stored in the memory 140 or memory 270 is larger than the amount of data of the operation information given at the time of occurrence of the error or the amount of data of the operation information or state information given the predetermined time after occurrence of the error.

Hereinafter, operations of respective constituent units in the motor driving apparatus 220 of FIGS. 2 and 3 will be described.

The reactor L is disposed between a commercial AC power source 405 ($v_s$) and the converter 410 to perform power factor correction or voltage boost. The reactor L may also function to restrict harmonic current according to high-speed switching of the converter 410.

The input current detector A may detect input current $i_s$ that is inputted from the commercial AC power source 405. To this end, a current transformer (CT) or a shunt resistor may be used as the input current detector A. The detected input current $i_s$, which is a discrete signal in the form of a pulse, may be inputted to the inverter controller 430.

The converter 410 converts the commercial AC power 405 applied via the reactor L into DC power and output the DC power. While the commercial AC power 405 is illustrated as single-phase AC power, 3-phase AC power may be used as the commercial AC power 405. The internal structure of the converter 410 depends on the type of the commercial AC power source 405.

The converter 410 may be configured by diodes without a switching device. In this case, the converter 410 may perform the rectification operation without performing a separate switching operation.

For example, when the applied power is single-phase AC power, 4 diodes may be used in a form of a bridge. When the applied power is 3-phase AC power, 6 diodes may be used in the form of a bridge.

As the converter 410, a half-bridge converter formed by connecting, for example, 2 switching devices and 4 diodes may be used. When 3-phase AC power is used, 6 switching devices and six diodes may be used.

When the converter 410 is provided with switching devices, the converter 410 may perform voltage boost, power factor improvement and DC power conversion according to the switching operation of the switching devices.

The smoothing capacitor C smooths and stores input power. While, the figure illustrates that one smoothing capacitor C is used, a plurality of smoothing capacitors may be provided to secure device stability.

While the smoothing capacitor C is illustrated as being connected to the output terminal of the converter 410, embodiments of the present invention are not limited thereto. DC power may be directly applied to the smoothing capacitor C. For example, DC power from a solar cell may be directly inputted to the smoothing capacitor C or inputted to the smoothing capacitor C via DC-DC conversion. Hereinafter, description will be given based on details illustrated in the figures.

As DC power is stored in the smoothing capacitor C, both ends of the smoothing capacitor C may be referred to as DC ends or DC link ends.

The DC link voltage detector B may detect a DC link voltage Vdc between both ends of the smoothing capacitor C. To this end, the DC link voltage detector B may include a resistor device and an amplifier. The detected DC link voltage Vdc may be inputted to the inverter controller 430 as a discrete signal in the form of a pulse.

The inverter 420 may be provided with a plurality of inverter switching devices. Thereby, the inverter 420 may convert the rectified DC power Vdc into 3-phase AC powers va, vb, and vc of predetermined frequencies according to turning on/off of the switching devices and outputting the converted powers to a 3-phase synchronous motor 230.

The inverter 420 includes upper switching devices Sa, Sb and Sc and lower switching devices S'a, S'b and S'c. Each of the upper switching devices Sa, Sb, Sc and a corresponding lower switching device S'a, S'b, S'c are connected in series to form a pair. Three pairs of upper and lower switching devices Sa and S'a, Sb and S'b, and Sc and S'c are connected in parallel. Each of the switching devices Sa, S'a, Sb, S'b, Sc and S'c is connected with a diode in an antiparallel manner.

Each of the switching devices in the inverter 420 is turned on/off based on an inverter switching control signal Sic from the inverter controller 430. Thereby, 3-phase AC power having a predetermined frequency is outputted to the 3-phase synchronous motor 230.

The inverter controller 430 may control the switching operation of the inverter 420 in a sensorless manner. To this end, the inverter controller 430 may receive an output current $i_o$ detected by the output current detector E.

In order to control the switching operation of the inverter 420, the inverter controller 430 outputs the inverter switching control signal Sic to the inverter 420. The inverter switching control signal Sic is a pulse width modulated (PWM) switching control signal. The inverter switching control signal Sic is generated and outputted based on the output current $i_o$ detected by the output current detector E. The operation of outputting the inverter switching control signal Sic from the inverter controller 430 will be described in detail with reference to FIG. 3 later in this specification.

The output current detector E detects the output current $i_o$ flowing between the inverter 420 and the 3-phase motor 230. That is, the output current detector E detects current flowing to the motor 230. The output current detector E may detect all output currents ia, ib and ic of the respective phases, or detect output currents of two phases using 3-phase smoothing.

The output current detector E may be positioned between the inverter 420 and the motor 230, and may employ a current transformer (CT), a shunt resistor, or the like to detect currents.

In using shunt resistors, three shunt resistors may be positioned between the inverter 420 and the synchronous motor 230, or ends of the shunt resistors may be connected to the three lower switching devices S'a, S'b and S'c of the inverter 420. It is also possible to use two shunt resistors based on 3-phase smoothing. When a single shunt resistor is employed, the shunt resistor may be disposed between the capacitor C and the inverter 420.

The detected output current $i_o$ may be a discrete signal in the form of a pulse and may be applied to the inverter controller 430. The inverter switching control signal Sic is generated based on the detected output current $i_o$. In the following description, the output current $i_o$ may be illustrated as including 3-phase output currents ia, ib and ic.

The 3-phase motor 230 includes a stator and a rotor. The rotor rotates when AC current of a phase of a predetermined frequency is applied to a coil of a corresponding phase (of a, b and c phases) of the stator.

The motor 230 may include, for example, a Surface-Mounted Permanent-Magnet Synchronous Motor (SMPMSM), an Interior Permanent Magnet Synchronous Motor (IPMSM), and a Synchronous Reluctance Motor (SynRM). The SMPMSM and the IPMSM are Permanent Magnet Synchronous Motors (PMSM) employing permanent magnets, while the SynRM does not have a permanent magnet.

FIG. 4 is an internal block diagram illustrating an inverter controller of FIG. 3.

Referring to FIG. 4, the inverter controller 430 may include a reference frame transformation unit 310, a speed calculator 320, a current command generator 330, a voltage command generator 340, a reference frame transformation unit 350, and a switching control signal output unit 360.

The reference frame transformation unit 310 receives the 3-phase output currents (ia, ib, ic) detected by the output current detector E, and transforms the same into 2-phase currents (iα, iβ) in a stationary reference frame.

The reference frame transformation unit 310 may transform 2-phase currents (iα, iβ) in the stationary reference frame into 2-phase currents (id, iq) in a rotating reference frame.

The speed calculator 320 may output a position $\hat{\theta}_r$ and a speed $\hat{\omega}_r$ calculated based on the 2-phase currents (iα, iβ) of the stationary reference frame that are frame-transformed by the reference frame transformation unit 310.

The current command generator 330 generates a current command value $i^*_q$ based on the calculated speed $\hat{\omega}_r$ and a speed command value $\omega^*_r$. For example, the current command generator 330 may perform PI control in a PI controller 335 and generate the current command value $i^*_q$ based on the difference between the calculated speed $\hat{\omega}_r$ and the speed command value $\omega^*_r$. While FIG. 4 illustrates a q-axis current command value $i^*_q$ as a current command value, a d-axis current command value $i^*_d$ may also be generated. The d-axis current command value $i^*_d$ may be set to 0.

The current command generator 330 may further include a limiter (not shown) for limiting the level of the current command value $i^*_q$ such that the current command value $i^*_q$ does not exceed an allowable range.

Next, the voltage command generator 340 generates d-axis and q-axis voltage command values $v^*_d$ and $v^*_q$ based on the d-axis and q-axis currents $i_d$ and $i_q$ which are transformed into currents in the 2-phase rotating reference frame by the reference frame transformation unit and the current command values $i^*_d$ and $i^*_q$ from the current command generator 330. For example, the voltage command generator 340 may perform PI control in a PI controller 344 and generate a q-axis voltage command value $v^*_q$ based on the difference between the q-axis current $i_q$ and the q-axis current command value $i^*_q$. In addition, the voltage command generator 340 may perform PI control in a PI controller 348 and generate the d-axis voltage command value $v^*_d$ based on the difference between the d-axis current id and the d-axis current command value $i^*_d$. The voltage command generator 340 may further include a limiter (not shown) for limiting the levels of the d-axis and q-axis voltage command values $v^*_d$ and $v^*_q$ such that the d-axis and q-axis voltage command values $v^*_d$ and $v^*_q$ do not exceed an allowable range.

The generated d-axis and q-axis voltage command values $v^*_d$ and $v^*_q$ are inputted to the reference frame transformation unit 350.

The reference frame transformation unit 350 receives the position $\hat{\theta}_r$ calculated by the speed calculator 320 and the d-axis and q-axis voltage command values $v^*_d$ and $V^*_q$ and performs reference frame transformation.

The reference frame transformation unit 350 transforms a 2-phase rotating reference frame into a 2-phase stationary reference frame. The transformation may be performed using the position $\hat{\theta}^*_r$ calculated by the speed calculator 320.

The reference frame transformation unit 350 may also transform the 2-phase stationary reference frame into a 3-phase stationary reference frame. Through such transformation, the reference frame transformation unit 350 outputs 3-phase output voltage command values $v^*_a$, $v^*_b$, and $v^*_c$.

The switching control signal output unit 360 outputs a PWM inverter switching control signal Sic based on the 3-phase output voltage command values $v^*_a$, $v^*_b$, and $v^*_c$.

The output inverter switching control signal Sic is transformed into a gate drive signal in a gate drive unit (not shown) and then inputted to the gate of each switching device in the inverter 420. Thereby, the switching devices Sa, S'a, Sb, S'b, Sc, and S'c in the inverter 420 perform the switching operation.

Figure 5:
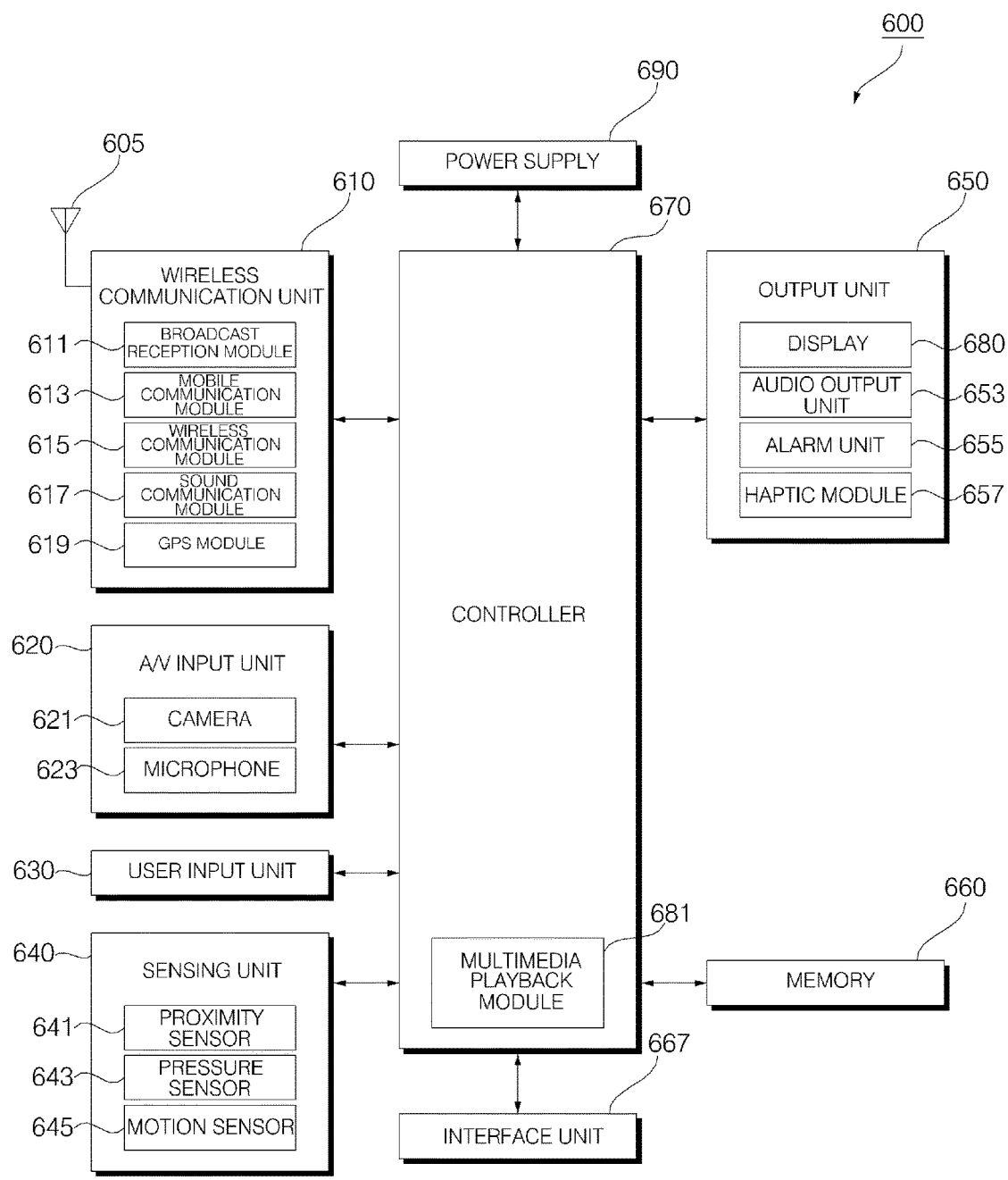
FIG. 5 is an internal block diagram illustrating the mobile terminal of FIG. 1.

FIG. 5 is an internal block diagram illustrating the mobile terminal of FIG. 1.

Referring to FIG. 5, the mobile terminal 600 may include the wireless communication unit 610, an A/V (Audio/Video) input unit 620, a user input unit 630, a sensing unit 640, an output unit 650, a memory 660, an interface unit 667, a controller 670, and a power supply 690.

The wireless communication unit 610 may include a broadcast reception module 611, a mobile communication module 613, a wireless Internet (communication) module 615, a sound communication unit 617, and a GPS module 619.

The broadcast reception module 611 may receive at least one of a broadcast signal and broadcast-related information from an external broadcast management server over a broadcast channel. The broadcast channel may include a satellite channel and a terrestrial channel.

The broadcast signal and/or the broadcast-related information received through the broadcast reception module 611 may be stored in the memory 660.

The mobile communication module 613 transmits and receives a radio signal to and from at least one of a base station, an external terminal and a server over a mobile communication network. Herein, the radio signal may contain various kinds of data according to transmission and reception of a voice call signal, a video call signal, or a text/multimedia message.

The wireless Internet module 615 refers to a module for wireless Internet access. The wireless Internet module 615 may be installed inside or outside the mobile terminal 600. For example, the wireless Internet module 615 may perform Wi-Fi-based wireless communication or Wi-Fi Direct-based wireless communication.

The sound communication unit 617 may perform sound communication. The sound communication unit 617 may output sound by adding predetermined information to audio data to be outputted in a sound communication mode. In addition, the sound communication unit 617 may extract predetermined information from a received sound in the sound communication mode.

Additionally, as short-range communication technology, Bluetooth, Radio Frequency Identification (RFID), Infrared Data Association (IrDA), Ultra Wideband (UWB), and Zig-Bee, for example, may be employed.

The Global Position System (GPS) module 619 may receive position information from a plurality of GPS satellites.

The A/V (Audio/Video) input unit 620, which is used to input an audio signal or a video signal, may include a camera 621 and a microphone 623.

The user input unit 630 generates key input data which is inputted by the user to control operation of the terminal. To this end, the user input unit 630 may be configured as a keypad, a dome switch, a touchpad (resistive touchpad/capacitive touchpad), and the like. Particularly, when a touchpad and a display 680 construct a layered structure, the structure may be referred to as a touchscreen.

The sensing unit 640 may sense present states of the mobile terminal 600 such as the opened or closed state of the mobile terminal 600, the location of the mobile terminal 600 and presence of user contact, and generate a sensing signal for controlling operation of the mobile terminal 600.

The sensing unit 640 may include a proximity sensor 641, a pressure sensor 643, and a motion sensor 645. The motion sensor 645 may sense movement or location of the mobile terminal 600 using an acceleration sensor, a gyro sensor, a gravity sensor, and the like. Particularly, the gyro sensor, which serves to measure an angular speed, may sense the orientation (angle) with respect to a reference direction.

The output unit 650 may include the display 680, an audio output unit 653, an alarm unit 655, and a haptic module 657.

The display 680 displays and outputs information processed by the mobile terminal 600.

When the display 680 and a touchpad construct a layered structure to form a touchscreen as described above, the display 680 may be used not only as an output device but also as an input device through which information can be input according to a user touch.

The audio output unit 653 outputs audio data received from the wireless communication unit 610 or stored in the memory 660. The audio output unit 653 may include a speaker and a buzzer, for example.

The alarm unit 655 outputs a signal indicating occurrence of an event on the mobile terminal 600. For example, the signal may be outputted in the form of vibration.

The haptic module 657 generates various haptic effects which can be felt by the user. A typical example of the haptic effects generated by the haptic module 657 is vibration.

The memory 660 may store a program for processing and controlling operations of the controller 670, or perform a function of temporarily storing data (e.g., a phonebook, a message, a still image, a moving image, etc.) which is inputted or outputted.

The interface unit 667 serves as an interface between the mobile terminal 600 and all external devices connected thereto. The interface unit 667 may receive data from the external devices or applied power and deliver the same to internal constituents of the mobile terminal 600. The interface unit 667 may also allow data in the mobile terminal 600 to be transmitted to external devices.

Usually, the controller 670 controls operation of each unit described above and also controls overall operations of the mobile terminal 600. For example, the controller 670 may perform relevant control and processing for a voice call, data communication and a video call. The controller 670 may include a multimedia reproduction module 681 for reproducing multimedia. The multimedia reproduction module 681 may be provided in the controller 670 as hardware, or configured as software separate from the controller 670 and executed by the controller 670.

External power or internal power is applied to the power supply 690 under control of the controller 670, and the power supply 690 supplies power necessary for operations of the respective constituents.

The block diagram of the mobile terminal 600 shown in FIG. 5 is a block diagram of an embodiment of the present invention. Each constituent in the block diagram may be integrated, added or omitted according to the specifications of the mobile terminal 600 as realized. That is, two or more constituents may be combined to form one constituent, or one constituent may be divided into two or more constituents. In addition, functions performed by the respective blocks are simply illustrative, and the specific operations or devices thereof do not limit the scope of the present invention.

FIG. 6 is a flowchart illustrating a method for operating a mobile terminal and a home appliance according to an embodiment of the present invention, and FIGS. 7A to 10C are views explaining the method of FIG. 6.

Referring to FIG. 6, the controller 670 of the mobile terminal 600 performs a control operation to display a home appliance-related screen based on a user input (S610).

For example, when an application for control of a home appliance installed in the mobile terminal 600 is executed, the controller 670 of the mobile terminal 600 may perform a control operation to display a screen related to the home appliance.

Alternatively, when a pairing signal or a pairing response signal is received from the home appliance 100 through the communication unit 610, the controller 670 of the mobile terminal 600 may perform a control operation to display a screen related to the home appliance according to a user input or automatically after completing pairing with the home appliance.

Next, when an input for the management mode is provided with the home appliance-related screen displayed (S615), the controller 670 of the mobile terminal 600 may control the communication unit 610 to transmit a management data request Sr1 (S620).

The controller 170 of the home appliance 100 may receive a management data request Sr1 from the mobile terminal 600 through the communication unit 130 (S621).

Then, the controller 170 of the home appliance 100 may control the sound output unit 185 to output first sound So1 corresponding to the management data stored in the memory 140 (S623).

The sound output unit 185 may include a speaker to output sound.

Alternatively, the sound output unit 185 may include the motor 230 and inverter 420 in the drive unit 220.

For example, the sound output unit 185 may include the inverter 420 (see FIG. 2) including a plurality of switching devices and configured to convert DC power to AC power according to switching operation of the switching devices and to supply the AC power to the motor 230 (see FIG. 3). In outputting sound, the controller 170 may change the switching frequency of the respective switching devices of the inverter, and perform a control operation to output sound corresponding to the changed switching frequency.

The controller 170 of the home appliance 100 may allocate management data to respective sound signals, and output different sound according to the type of the management data.

Alternatively, the controller 170 of the home appliance 100 may add management data to sound, in particular, in a modulation manner, and output the sound containing the management data.

In this case, the sound output unit 185 may include a frequency transformer 510 (see FIG. 10B) to transform the frequency of sound to be outputted, a data insertion unit 515 (see FIG. 10B) to insert management data into a frequency-transformed audio signal, an inverse transformer 520 (see FIG. 10B) to inversely transform the audio signal containing the inserted management data, and a multiplexer 525 (see FIG. 10B) to multiplex the inversely transformed audio signal, and may output sound corresponding to the multiplexed audio signal.

The controller 670 or sound communication module 617 of the mobile terminal 600 may acquire the first sound So1 through the microphone 623 (S625).

Then, the controller 670 or sound communication module 617 of the mobile terminal 600 extracts the management data from the first sound So1.

Then, the controller 670 of the mobile terminal 600 controls a management data screen to be displayed based on the extracted management data (S630). Thereby, the management data for the home appliance may be easily displayed.

In this case, the management data displayed in the management data screen may include power consumption information, recommended operation information, current operation information and product management information.

Next, when an input for the diagnosis mode is provided with the home appliance-related screen displayed (S635), the controller 670 of the mobile terminal 600 may control the communication unit 610 to transmit a diagnostic data request Sr2 (S640).

If an error occurs (S615), the controller 170 of the home appliance 100 may perform a control operation, separately from the operation of the mobile terminal 600, to store diagnostic data in the memory 140.

Herein, the diagnostic data may include periodically stored operation information state information, operation information at the time of error occurrence, and operation information or state information after a predetermined time from the time of error occurrence.

For example, the diagnostic data may include temperature information, compressor discharge temperature information, outdoor fan speed information, indoor fan operation mode information, and error occurrence information.

The controller 170 of the home appliance 100 may receive the diagnostic data request Sr2 from the mobile terminal 600 through the communication unit 130 (S641).

Then, the controller 170 of the home appliance 100 may control the sound output unit 185 to output second sound So2 corresponding to the diagnostic data stored in the memory 140 (S643).

The second sound So2 may be outputted through a speaker in the sound output unit 185.

Alternatively, the second sound So2 may be outputted through the motor 230 in the drive unit 220 in the sound output unit 185.

For example, the sound output unit 185 may include the inverter 420 (see FIG. 2) including a plurality of switching devices and configured to convert DC power into AC power according to switching operation of the switching devices and to supply the AC power to the motor 230 (see FIG. 3). In outputting sound, the controller 170 may change the switching frequency of the respective switching devices of the inverter, and perform a control operation to output sound corresponding to the changed switching frequency.

The controller 170 of the home appliance 100 may allocate diagnostic data to respective sound signals, and output different sound according to the type of the diagnostic data.

Alternatively, the controller 170 of the home appliance 100 may add diagnostic data to sound, in particular, in a modulation manner, and output the sound containing the diagnostic data.

In this case, the sound output unit 185 may include a frequency transformer 510 (see FIG. 10B) to transform the frequency of sound to be outputted, a data insertion unit 515 (see FIG. 10B) to insert diagnostic data into a frequency-transformed audio signal, an inverse transformer 520 (see FIG. 10B) to inversely transform the audio signal containing the inserted diagnostic data, and a multiplexer 525 (see FIG. 10B) to multiplex the inversely transformed audio signal, and may output sound corresponding to the multiplexed audio signal.

The controller 670 of the mobile terminal 600 may acquire the second sound So2 through the microphone 623.

Then, the controller 670 of the mobile terminal 600 extracts the diagnostic data from the second sound So2 (S645).

Then, the controller 670 of the mobile terminal 600 controls a diagnostic data screen to be displayed based on the extracted diagnostic data (S650). Thereby, the diagnostic data for the home appliance may be easily displayed.

In this case, the diagnostic data displayed in the diagnostic data screen may include information indicating whether or not an error occurred, error information and temperature information.

The diagnostic data may include at least one of discharge temperature information about a compressor, outdoor fan speed information, indoor fan operation mode information, information about an electrical current in the drive unit, and voltage information.

The voltage information may be, for example, a DC-terminal voltage or an input voltage. The information about the electrical current may be, for example, an output current or input current flowing through the motor 230.

Figure 7B:
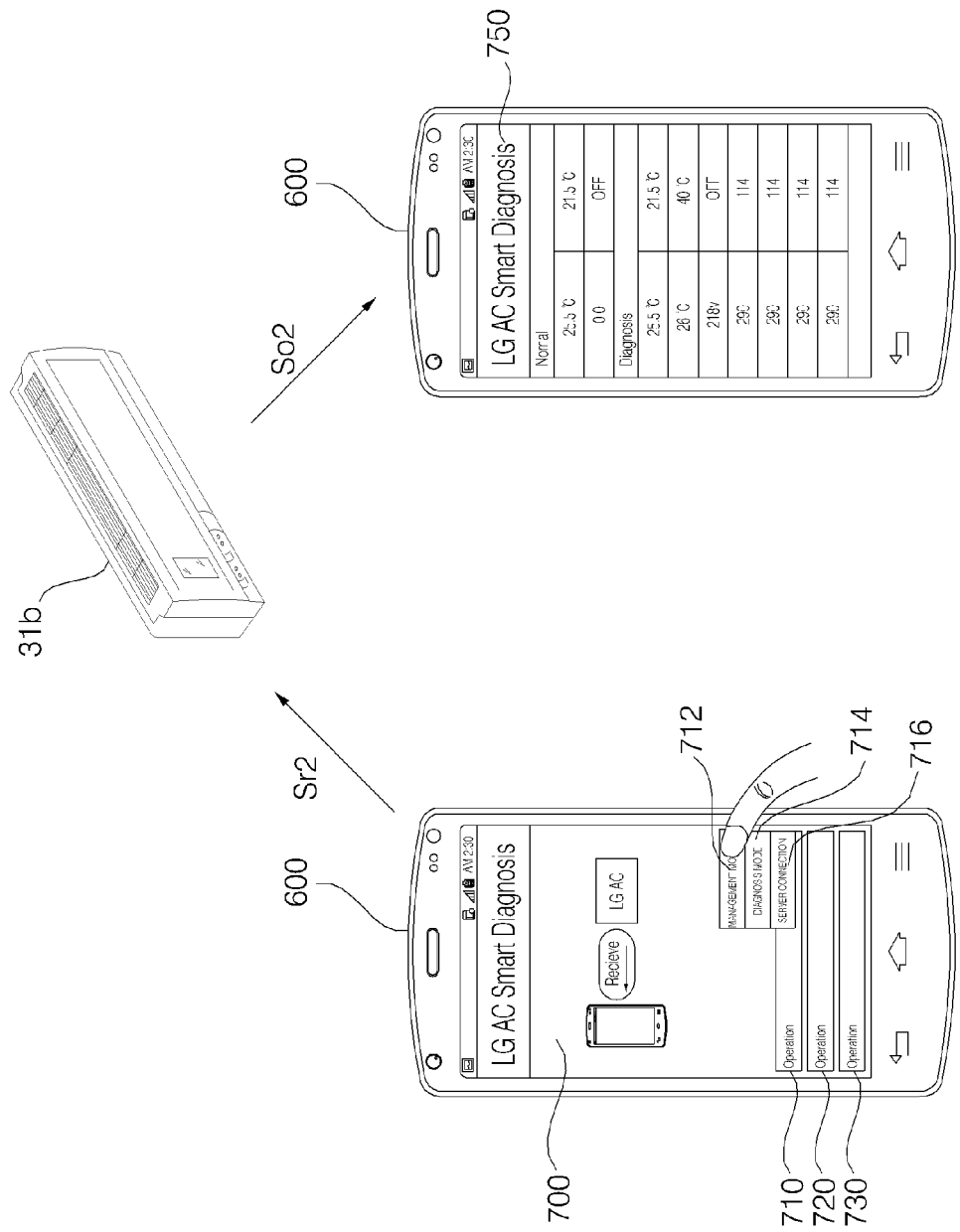
FIGS. 7A to 10C are views illustrating the operation methods of FIG. 6.
Figure 7C:
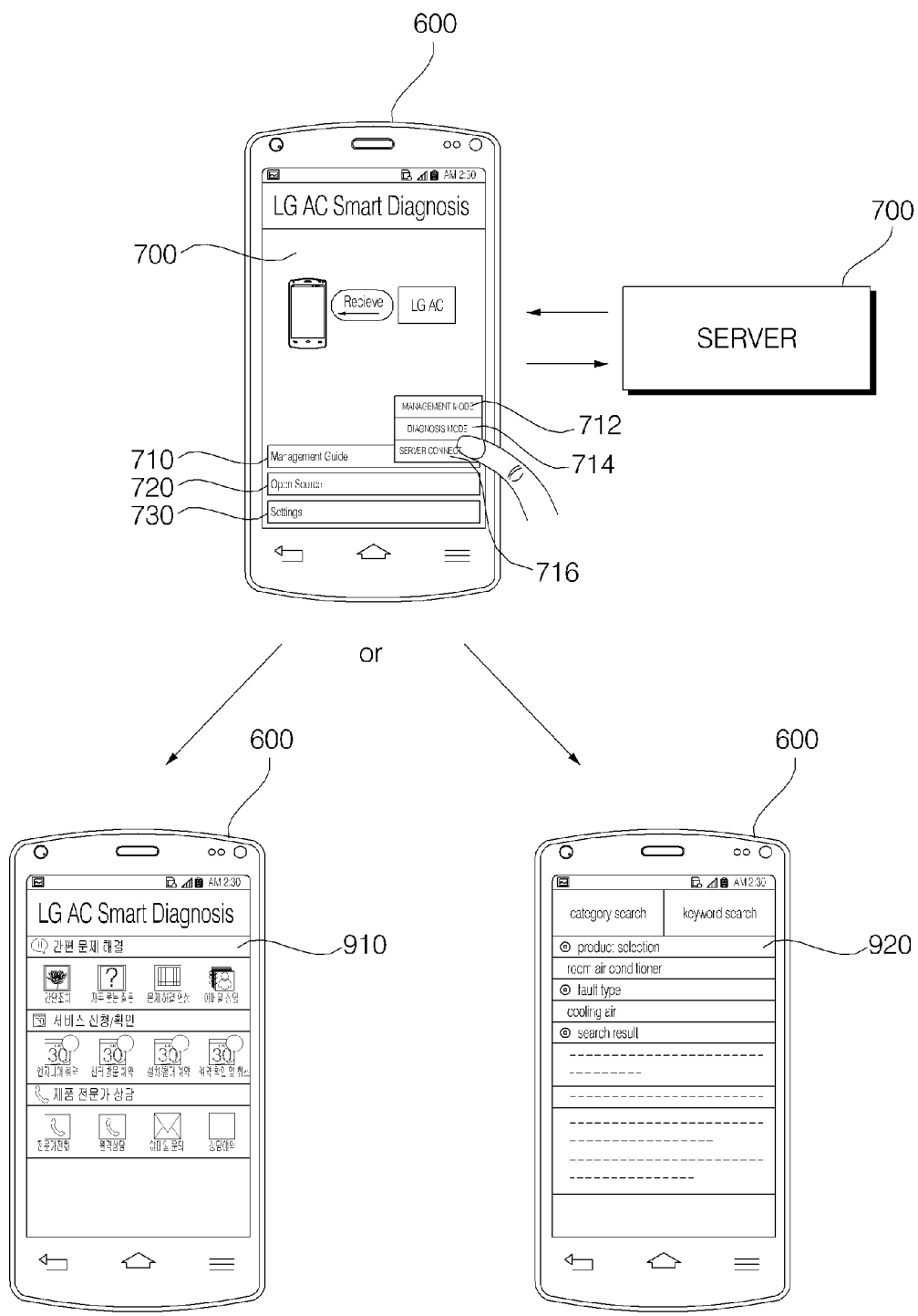

The controller 670 of the mobile terminal 600 may perform a control operation to transmit the diagnostic data to a server 700, for example (see FIG. 7C).

Upon receiving result information based on the diagnostic data from the server 700, the controller 670 of the mobile terminal 600 may perform a control operation to display the result information on the display 680.

FIG. 7A illustrates an example of data exchange between an indoor unit 31*b* and the mobile terminal 600.

In particular, when an application for control of a home appliance installed in the mobile terminal 600 is executed, the controller 670 of the mobile terminal 600 may perform a control operation to display a home appliance-related screen 700, as shown in FIG. 7A.

The home appliance-related screen 700 may include a management item 710, a source item 720 and a setting item 730.

When the management item 710 is selected, the controller 670 of the mobile terminal 600 may perform a control operation to display a management mode item 712, a diagnosis mode item 714 and a server connection item 716 in a pop-up manner, as shown in the figure.

When the management mode item 712 is selected, the controller 670 of the mobile terminal 600 may perform a control operation to transmit a management data request Sr1 to the indoor unit 31*b*.

Upon receiving the management data request Sr1, a controller in the indoor unit 31*b* may perform a control operation to output first sound So1 corresponding to management data including operation information and state information about the outdoor unit 21*b* (see FIG. 13) and the indoor unit 31*b* stored in a memory.

Thereby, the controller 670 of the mobile terminal 600 may acquire the first sound So1 through the microphone 623, and extract the management data from the first sound So1.

Then, the controller 670 of the mobile terminal 600 may perform a control operation to display a management data screen 750 based on the received management data about an air conditioner 100*b* (see FIG. 13), as shown in the figure.

The management data screen 750 may include operation information including an operation mode, a flow rate, a desired temperature, and indoor temperature, recommended operation information including a recommended mode, a desired temperature and a flow rate, power consumption information including an instantaneous power and an accumulated power, and error information.

FIG. 7B illustrates another example of data exchange between the indoor unit 31*b* and the mobile terminal 600.

In particular, when an application for control of a home appliance installed in the mobile terminal 600 is executed, the controller 670 of the mobile terminal 600 may perform a control operation to display the home appliance-related screen 700, as shown in FIG. 7B.

When the management item 710 is selected in the home appliance-related screen 700, the controller 670 of the mobile terminal 600 may perform a control operation to display the management mode item 712, diagnosis mode item 714, and server connection item 716 in a pop-up manner, as shown in the figure.

When the diagnosis mode item 714 is selected, the controller 670 of the mobile terminal 600 may perform a control operation to transmit a diagnostic data request Sr2 to the indoor unit 31*b*.

Upon receiving the diagnostic data request Sr2, the controller in the indoor unit 31*b* may perform a control operation to output second sound So2 corresponding to diagnostic data including operation information and state information about the outdoor unit 21*b* and the indoor unit 31*b* stored in the memory.

Thereby, the controller 670 of the mobile terminal 600 may acquire the second sound So2 through the microphone 623, and extract the diagnostic data from the second sound So2.

Then, the controller 670 of the mobile terminal 600 may perform a control operation to display a diagnostic data screen 750 based on the received diagnostic data about the air conditioner 100*b*, as shown in the figure.

The diagnostic data screen 750 may include outdoor unit temperature information, compressor discharge temperature information, outdoor fan speed information, indoor fan operation mode information, error occurrence information, indoor temperature information, power consumption information, compressor frequency information, input voltage information, DC-terminal voltage information, input current information, and EEV pulse information.

The controller 670 of the mobile terminal 600 may autonomously perform smart diagnosis based on the received diagnostic data. For example, if the fan of the indoor unit 31*b* malfunctions, the controller 670 may determine that the fan malfunctions, based on the received diagnostic data.

Alternatively, to ensure smart diagnosis, the controller 670 of the mobile terminal 600 may perform a control operation to transmit the received diagnostic data to the server 700.

FIG. 7C illustrates selecting the diagnostic data screen 750 after selecting the management item 710 in the home appliance-related screen 700.

When the server connection item 716 is selected in the home appliance-related screen 700, the controller 670 of the mobile terminal 600 may perform a control operation to connect to the server 700 and to display a service screen provided from the server 700.

FIG. 7C shows a smart diagnosis screen 910 for requesting and checking smart diagnosis as a first service screen or a screen 920 indicating a simple troubleshooting method as a second service screen according to the smart diagnosis.

Thereby, the user of the mobile terminal 600 may be provided with a desired service.

Upon receiving a diagnosis result from the server 700 or determining the diagnosis result, the controller 670 of the mobile terminal 600 may perform a control operation to display the diagnosis result information on the display 680. Thereby, the diagnosis result based on the diagnostic data may be easily checked.

The sound output unit 185 may include the inverter 420 and motor 230 in the drive unit 220, and output sound using the inverter 420 and motor 230. Details will be described below with reference to FIGS. 8A and 8B.

Figure 8A:
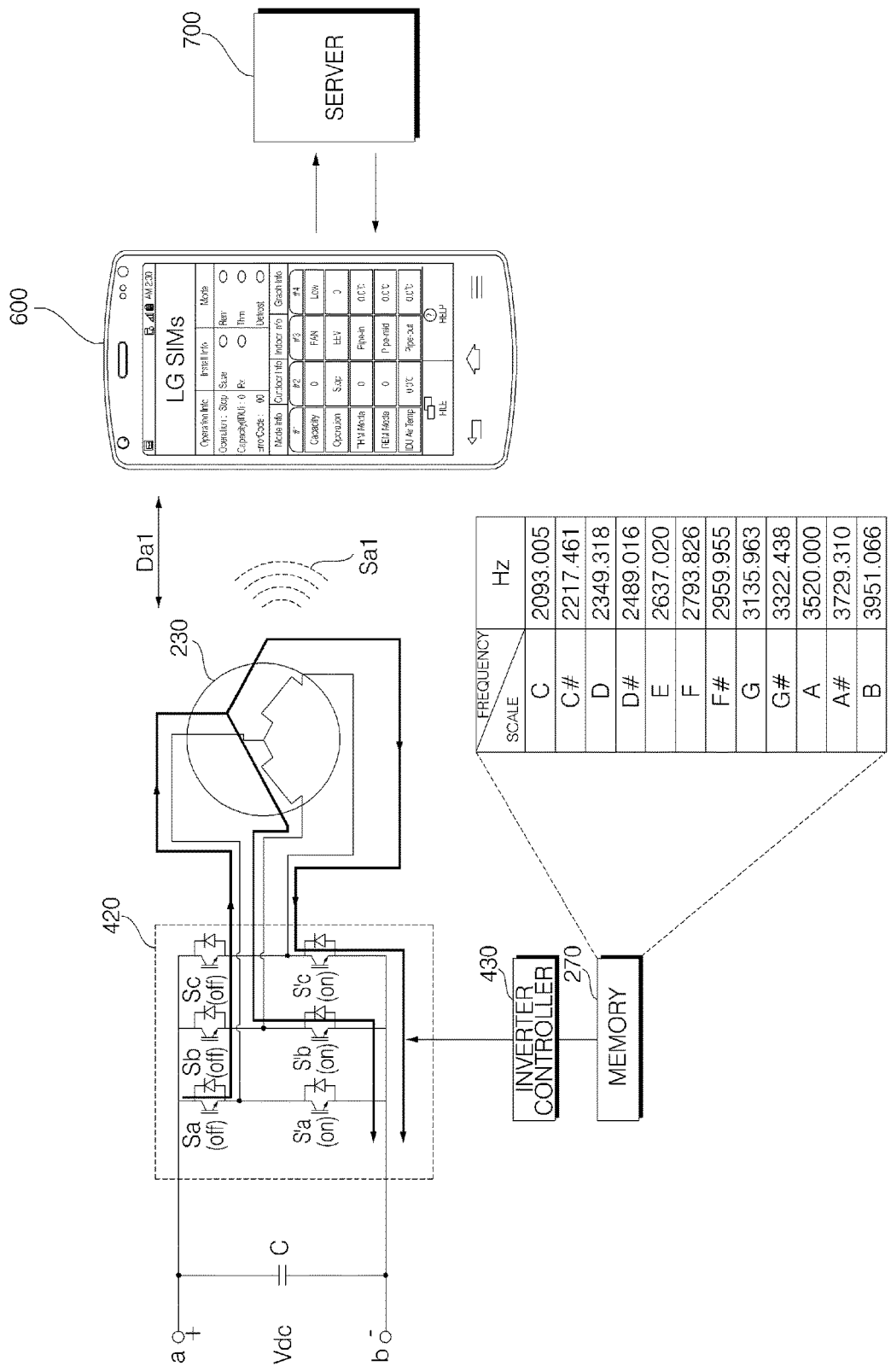
Figure 8B:
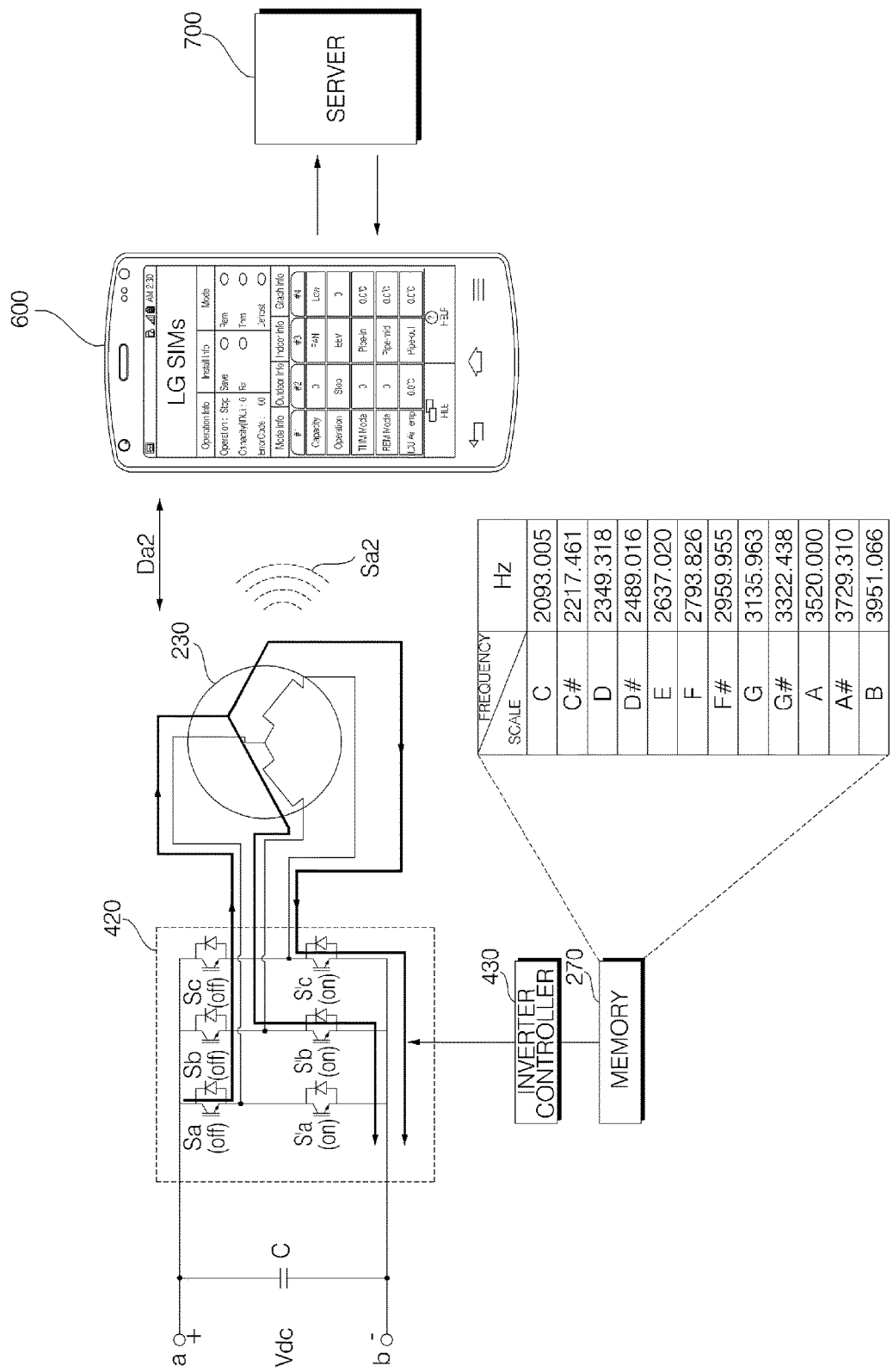

FIG. 8A illustrates a case where the motor driving apparatus 220 is a first distance Da1 from the mobile terminal 600, and FIG. 8B illustrates a case where the motor driving apparatus 220 is a second distance Da2 from the mobile terminal 600.

The inverter controller 430 may calculate the distance between the drive unit 220 and the mobile terminal 600 using an IR signal-based first remote control signal for requesting management data or an IR signal-based second remote control signal for requesting diagnostic data, received through the communication unit 130.

Specifically, the inverter controller 430 may calculate the distance according to the intensity of the first or second remote control signal. For example, as the intensity of the first or second remote control signal decreases, the calculated distance may increase.

It is also possible for the inverter controller 430 to calculate the distance according to the intensity of a remote control signal based on an RF signal (BLE signal, ZigBee signal or Wi-Fi signal) other than the IR signal.

The inverter controller 430 may change the volume or frequency of output sound or the amount of data added to the sound according to the calculated distance. Details will be described with reference to the figure. As shown in the figures, the inverter controller 430 may control first sound Sa1 of a first volume to be outputted when the motor driving apparatus 220 is the first distance Da1 from the mobile terminal 600, and control second sound Sa2 of a second volume louder than the first volume to be outputted when the motor driving apparatus 220 is the second distance Da2, which is greater than the first distance Da1, from the mobile terminal 600.

Alternatively, the inverter controller 430 may control the first sound Sa1 of a high frequency to be outputted when the motor driving apparatus 220 is the first distance Da1 from the mobile terminal 600, and control the second sound Sa2 of a low frequency lower than that of the first sound Sa1 to be outputted when the motor driving apparatus 220 is the second distance Da2, which is greater than the first distance Da1, from the mobile terminal 600. That is, the low frequency sound reaching farther than the high frequency sound may be controlled to be outputted.

Alternatively, the inverter controller 430 may control the first sound Sa1 to be outputted during a first period if the motor driving apparatus 220 is the first distance Da1 from the mobile terminal 600, and control the second sound Sa2 to be outputted during a second period, which is longer than the first period, if the motor driving apparatus 220 is the second distance Da2, which is greater than the first distance Da1, from the mobile terminal 600.

Alternatively, the inverter controller 430 may control the first sound Sa1 corresponding to a first amount of data to be outputted when the motor driving apparatus 220 is the first distance Da1 from the mobile terminal 600, and control the second sound Sa2 corresponding to a second amount of data larger than the first amount of data to be outputted when the motor driving apparatus 220 is the second distance Da2, which is greater than the first distance Da1, from the mobile terminal 600.

Figure 9A:
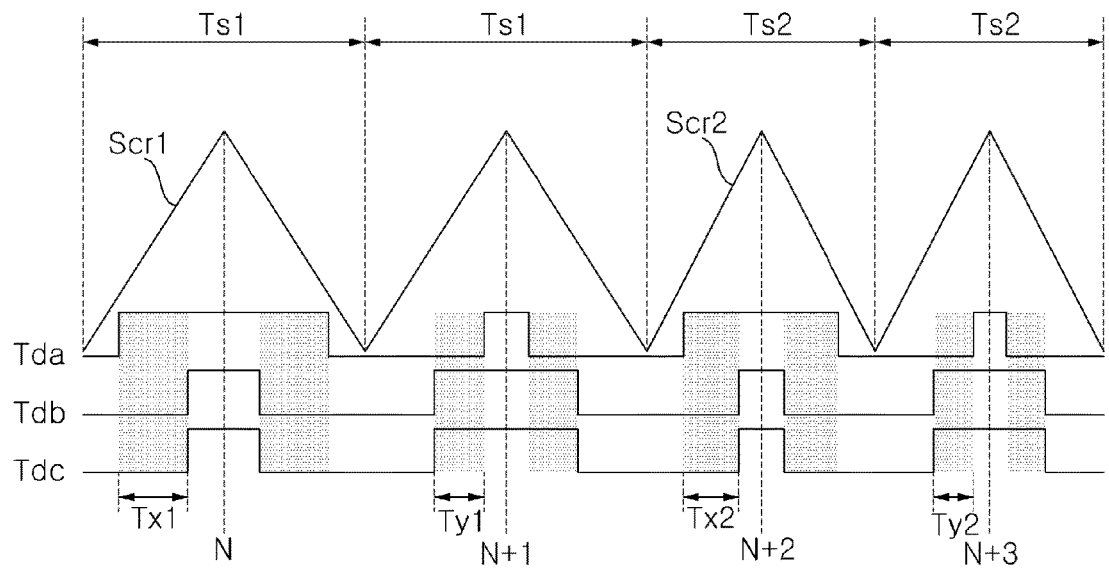
Figure 9B:
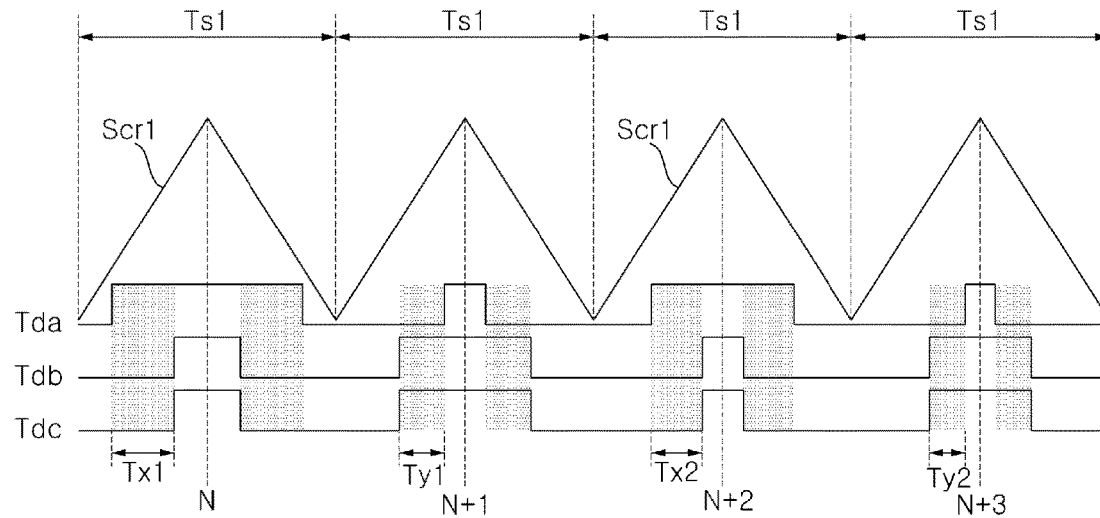

While FIGS. 9A and 9B illustrate that the first upper switching device Sa and the second and third lower switching devices S'b and S'c are turned on, the first lower switching device S'a is turned off, and the second and third upper switching devices Sb and Sc are turned on in order to output sound, various other embodiments are also possible.

The turning on/off of the switching devices for outputting sound illustrated in FIGS. 8A and 8B may be the same as an operation performed in the motor alignment.

The inverter controller 430 may change the turn-on duty of a switching control signal for driving the respective switching devices in the inverter 420 such that the volume of sound changes. Relevant details will be described with reference to FIGS. 9A and 9B.

FIGS. 9A and 9B illustrate a method of adjusting the volume of sound.

FIG. 9A illustrates change of the period from Ts1 to Ts2.

In the first Ts1 section, as the difference among an a-phase turn-on duty Tda, a b-phase turn-on duty Tdb and a c-phase turn-on duty Tdc increases, the current flowing through the motor 230 may increase, and thus the volume of sound may increase.

In the second Ts1 section, the a-phase turn-on duty decreases, and the b-phase turn-on duty and the c-phase turn-on duty increase. Thereby, the current increased in the first Ts1 section may be reduced.

Next, in the first Ts2 section, the period, namely the switching frequency changes, and the current flowing through the motor 230 increases according to the difference among the a-phase turn-on duty Tda, b-phase turn-on duty Tdb and c-phase turn-on duty Tdc. Thereby, the volume of sound may increase.

In the second Ts2 section, the a-phase turn-on duty decreases, and the b-phase turn-on duty and the c-phase turn-on duty increase. Thereby, the current increased in the first Ts2 section may be reduced.

FIG. 9B illustrates a constant period of Ts1.

In the first Ts1 section, as the difference among an a-phase turn-on duty Tda, a b-phase turn-on duty Tdb and a c-phase turn-on duty Tdc increases, the current flowing through the motor 230 may increase, and thus the volume of sound may increase.

In the second Ts1 section, the a-phase turn-on duty decreases, and the b-phase turn-on duty and the c-phase turn-on duty increase. Thereby, the current increased in the first Ts1 section may be reduced.

Next, in the first Ts1 section, the period, namely the switching frequency changes, and the current flowing through the motor 230 increases according to the difference among the a-phase turn-on duty Tda, b-phase turn-on duty Tdb and c-phase turn-on duty Tdc. Thereby, the sound volume may increase.

In the second Ts1 section, the a-phase turn-on duty decreases, and the b-phase turn-on duty and the c-phase turn-on duty Tdc increase. Thereby, the current increased in the first Ts2 section may be reduced.

When data is matched with various kinds of sound, the inverter controller 430 may output corresponding sound as described above.

Alternatively, the inverter controller 430 may control sound containing diagnostic data to be outputted. That is, the sound, which is an acoustic signal, may be used as a carrier, and data may be added to the acoustic signal according to a modulation scheme. Details will be described with reference to FIGS. 10A to 10C.

Figure 10A:
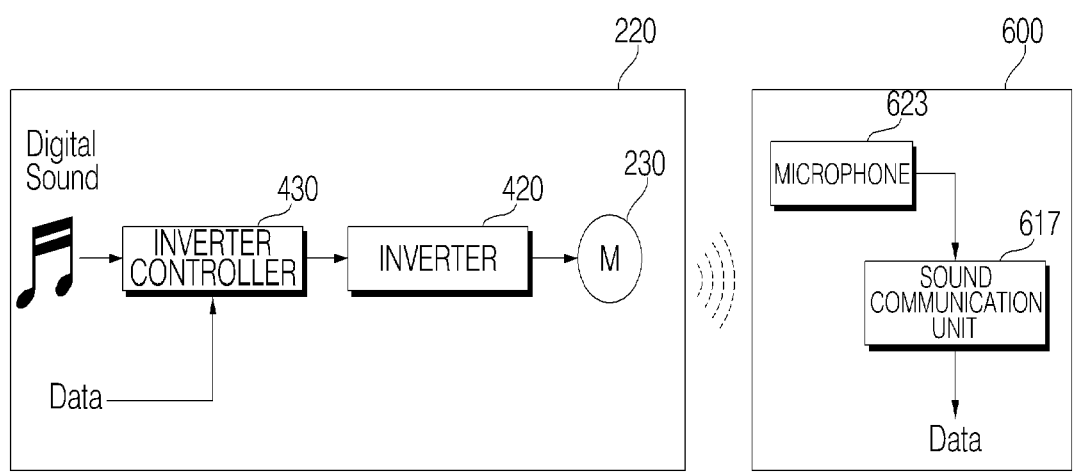
Figure 10B:
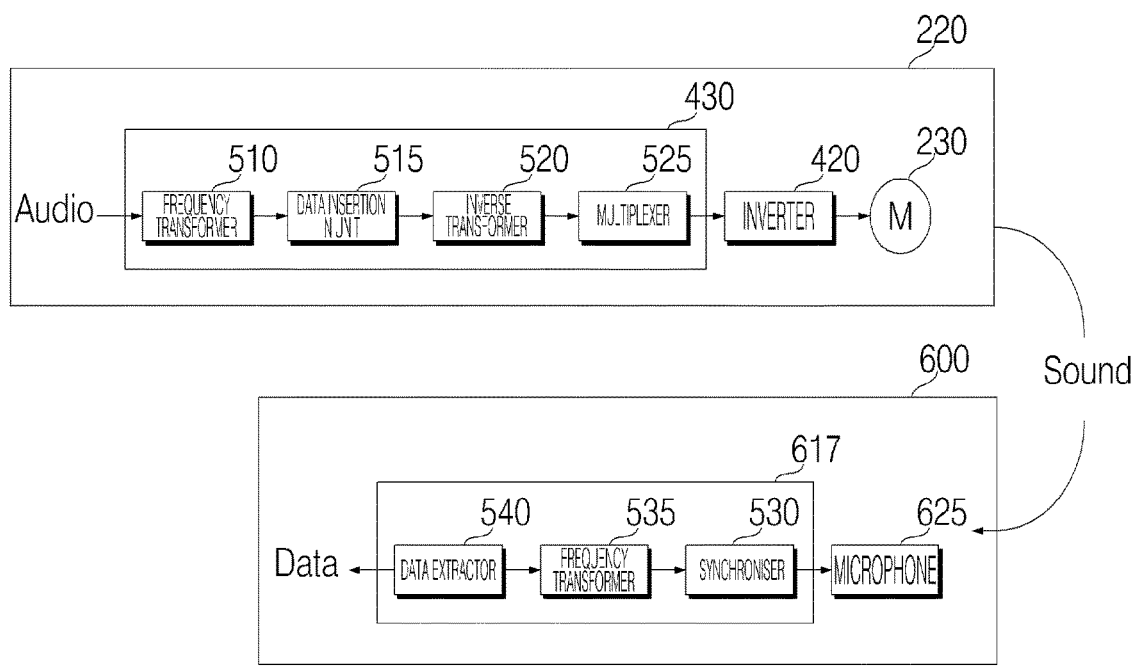
Figure 10C:
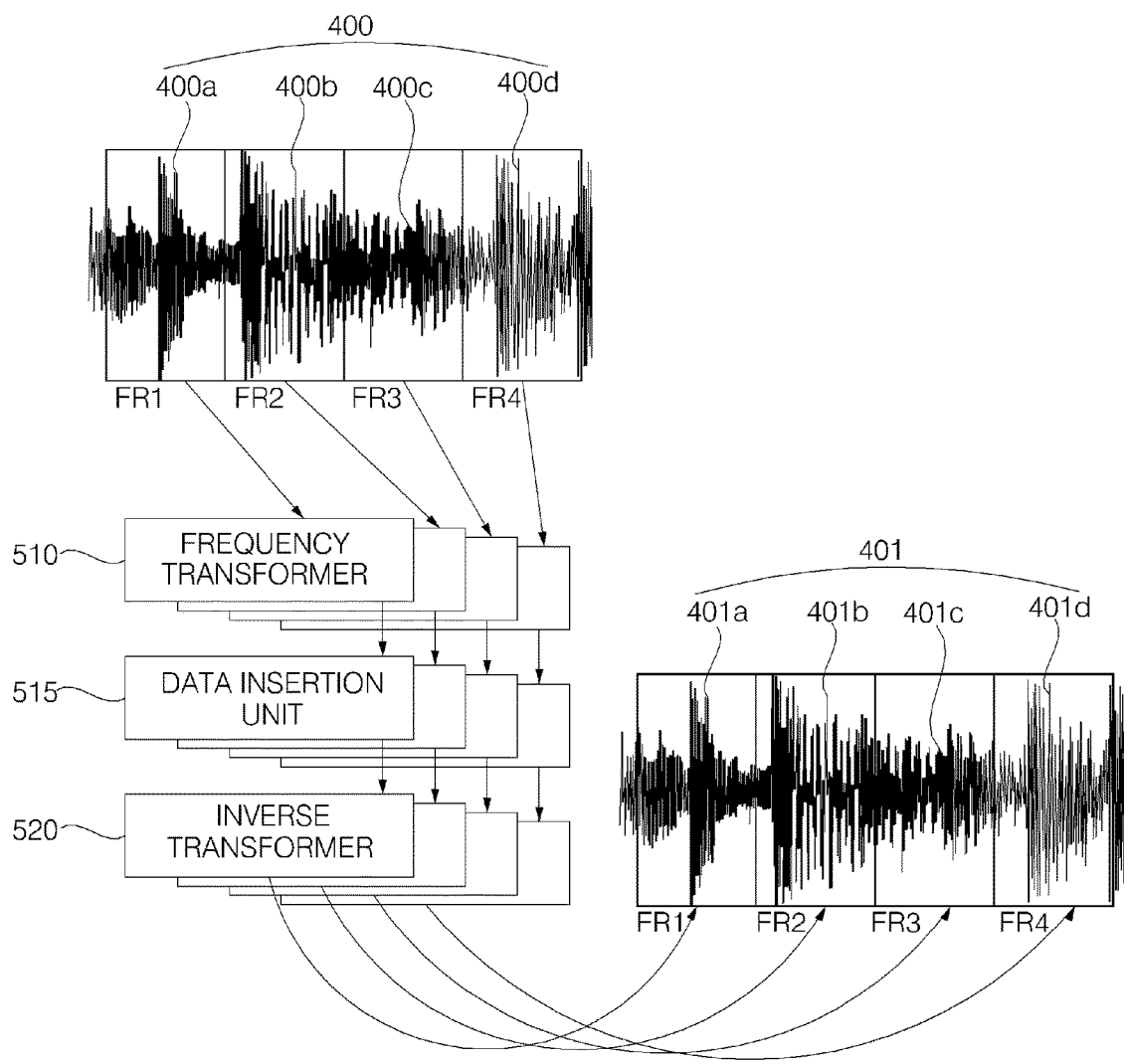

FIGS. 10A to 10C are reference diagrams illustrating sound communication.

FIG. 10A illustrates that the motor driving apparatus 220 in the home appliance 100 outputs sound through sound communication, and the mobile terminal 600 receives the sound.

To this end, the motor driving apparatus 220 may include the inverter controller 430, the inverter 420, and the motor 230.

The inverter controller 430 of the motor driving apparatus 220 receives an audio signal (digital sound) from, for example, the controller 170, and adds predetermined data to the audio signal (digital sound) to be outputted.

Then, the inverter controller 430 changes the switching frequency of the inverter 420 to output the audio signal carrying the predetermined data. Thereby, the sound carrying the predetermined data may be outputted through the motor 230.

The microphone 623 of the mobile terminal 600 receives the sound output from the motor driving apparatus 220. Then, the microphone 623 delivers the received sound signal to the sound communication module 617. The sound communication module 617 extracts the data from the sound.

Thereby, exchange of simple data of information may be implemented between the motor driving apparatus 220 and the mobile terminal 600.

As a reverse operation to the operation of FIG. 10A, the mobile terminal 600 may output sound through audio output unit 653, and the motor driving apparatus 220 may receive the sound.

FIG. 10B exemplarily shows an internal block diagram of the inverter controller 430 of the motor driving apparatus 220 and an internal block diagram of the sound communication module 617 in the mobile terminal 600.

In order to output sound, the inverter controller 430 of the motor driving apparatus 220 may include a frequency transformer 510, a data insertion unit 515, an inverse transformer 520, and a multiplexer 525.

The frequency transformer 510 may receive an audio signal to be outputted in the time domain and perform frequency transformation on the audio signal. The frequency transformation may be performed on a frame-by-frame basis. Specifically, the frequency transformation may be performed based on modulated complex lapped transform (MCLT).

The MCLT scheme is advantageous in that blocking artifacts at the frame boundary may be reduced according to overlapping of the respective frames.

The data insertion unit 515 adds or inserts predetermined data to or in the frequency-transformed audio signal. That is, data is added to the audio signal according to the modulation scheme. Specifically, of the coefficients (amplitude, phase, and the like) for each frequency having undergone frequency transformation, the phase may be changed to add data. For example, the changed phase may be 0° or 180°. Thereby, the added data may be distinguished.

The inverse transformer 520 performs inverse transform on the audio signal into which the data has been inserted. If MCLT is performed, the frequency transformer 510 performs inverse MCLT to output a sound signal in the time domain.

The frequency transformer 510, the data insertion unit 515 and the inverse transformer 520 may perform corresponding operations on a frame-by-frame basis.

The multiplexer 525 multiplexes and outputs the audio signal having undergone inverse transform. That is, a plurality of frames is multiplexed.

Then, the inverter controller 430 changes the switching frequency of the inverter 420. Thereby, multiplexed sound may be outputted through the motor 230.

The mobile terminal 600 receives sound through the microphone 623 and transforms the sound into an electrical signal. In order to extract data from the received sound, the sound communication module 617 in the mobile terminal 600 may include a synchronizer 530, a frequency transformer 535, and a data extractor 540.

The synchronizer 530 synchronizes received audio signals. That is, the synchronizer 530 may synchronize multiplexed audio signals and separate the same on a frame-by-frame basis.

The frequency transformer 535 may receive an audio signal to be outputted in the time domain and perform frequency transformation on the audio signal. The frequency transformation may be performed on a frame-by-frame basis. Specifically, the frequency transformation may be performed based on MCLT.

The data extractor 540 extracts data from the frequency-transformed audio signal. As described above, since the data is added to the signal by changing the phase coefficient of the coefficients for respective frequencies, the data may be extracted based on the phase coefficient. In particular, when the phase coefficient is 0° or 180°, the data may be extracted based on this value.

The extracted data may be delivered to the controller 670 of the mobile terminal 600.

According to MCLT-based sound communication, data may be added to sound similar to an audio signal which is originally intended to be outputted. In addition, the MCLT scheme is advantageous in that blocking artifacts at the frame boundary may be reduced according to overlapping of the respective frames.

FIG. 10C illustrates operation of the inverter controller 430 of FIG. 10B based on the audio waveform.

Referring to FIG. 10C, an audio signal 400 to be outputted is exemplarily shown. The audio signal 400 may be divided into a plurality of frames FR1 to FR4. In FIG. 10C, a first audio frame 400a is shown in a first frame FR1, a second audio frame 400b is shown in a second frame FR2, a third audio frame 400c is shown in a third frame FR3, and a fourth audio frame 400d is shown in a fourth frame FR4.

The frequency transformer 510 performs frequency transformation on the audio data on a frame-by-frame basis. Specifically, the frequency transformer 510 performs frequency transformation according to MCLT.

Then, the data insertion unit 515 adds predetermined data to the frequency-transformed audio signal on the frame-by-frame basis. Specifically, of the coefficients (amplitude, phase, and the like) for each frequency having undergone frequency transformation, the phase is changed to add data.

The inverse transformer 520 performs inverse transform on the audio signal carrying the data on a frame-by-frame basis. Thereby, a sound signal is outputted in the time domain.

In the figure, first to fourth sound signals 401a to 401d similar to first to fourth audio signals 400a to 400d are exemplarily shown in the respective frames. It can be seen from the figure that the first to fourth sound signals 401a to 401d are similar to the audio signals originally intended to be outputted.

The multiplexer 525 may multiplex sound signals carrying added data on a frame-by-frame basis.

The method for outputting sound for diagnostic data between the mobile terminal 600 and the home appliances 100 and transmitting a diagnostic data image based on the sound may be applied to various home appliances. For example, the method may be applied to a laundry treating appliance, an air conditioner, a refrigerator, a water purifier, a cleaner, a TV, a vehicle, a robot and a drone among home appliances.

Figure 11:
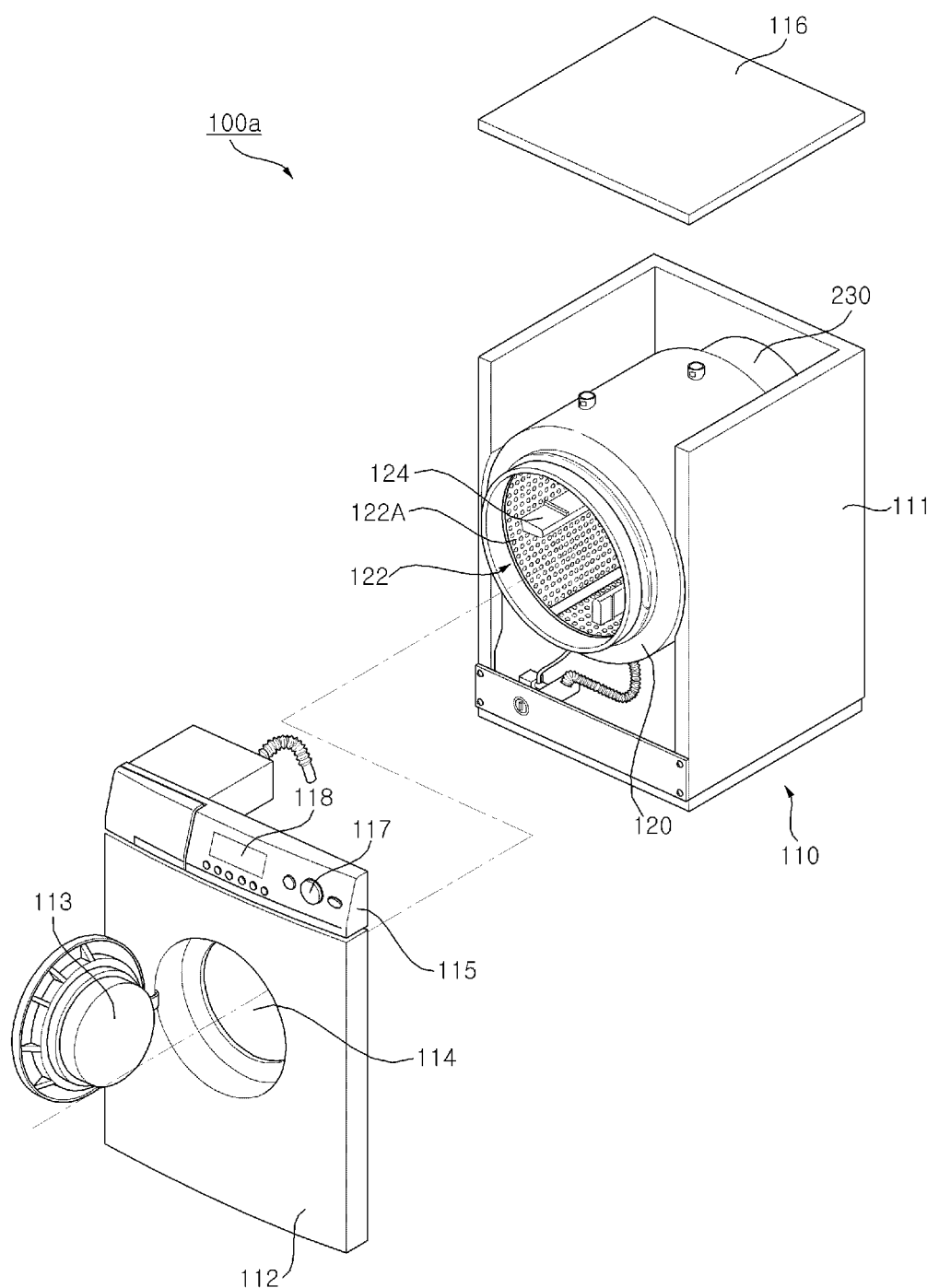
FIG. 11 is a perspective view illustrating a laundry treating appliance as an exemplary home appliances according to an embodiment of the present invention.

FIG. 11 is a perspective view illustrating a laundry treating appliance according to an embodiment of the present invention.

Referring to FIG. 11, a laundry treating appliance 100a is a front-loading laundry treating appliance wherein laundry is inserted from the front into a washtub. The front-loading laundry treating appliance includes a washing machine for performing the operations of washing, rinsing and drying of inserted laundry or a dryer for drying inserted wet laundry. Hereinafter, description will be given focusing on the washing machine.

The laundry treating appliance 100a of FIG. 11, which is a washtub-based laundry treating appliance, includes a cabinet 110 defining an exterior of the laundry treating appliance 100a, a tub 120 disposed inside the cabinet 110 and supported by the cabinet 110, a washtub 122 which is disposed inside the tub 120 and in which laundry is washed, a motor 230 for driving the washtub 122, and a wash water supplier (not shown) disposed outside a cabinet body 111 to supply wash water into the cabinet 110, and a drainage unit (not shown) formed on the lower side of the tub 120 to discharge wash water outward.

The washtub 122 is provided with a plurality of through holes 122A allowing wash water to pass therethrough. A lifter 124 may be disposed on an inner surface of the washtub 122 to lift the laundry to a certain height during rotation such that the laundry falls due to gravity.

The cabinet 110 includes the cabinet body 111, a cabinet cover 112 disposed on and connected to the front surface of the cabinet body 111, a control panel 115 disposed on the upper side of the cabinet cover 112 and connected to the cabinet body 111, and a top plate 116 disposed on the upper side of the control panel 115 and connected to the cabinet body 111.

The cabinet cover 112 includes a laundry introduction hole 114 formed to allow introduction and retrieval of laundry therethrough and a door 113 disposed to be horizontally rotatable to open and close the laundry introduction hole 114.

The control panel 115 includes manipulation keys 117 for controlling an operation state of the laundry treating appliance 100a and a display unit 118 disposed on one side of the manipulation keys 117 to display the operation state of the laundry treating appliance 100a.

The manipulation keys 117 and the display unit 118 in the control panel 115 are electrically connected to a controller (not shown). The controller (not shown) electrically controls respective constituents of the laundry treating appliance 100a. Operation of the controller (not shown) will be described later.

The washtub 122 may be provided with an auto-balancer (not shown). The auto-balancer (not shown), which serves to attenuate vibration caused by maldistribution of laundry contained in the washtub 122, may be implemented by, for example, a liquid balancer or a ball balancer.

Although not shown in FIG. 11, the laundry treating appliance 100a may further include a vibration sensor for measuring the degree of vibration of the washtub 122 or the cabinet 110.

Figure 12:
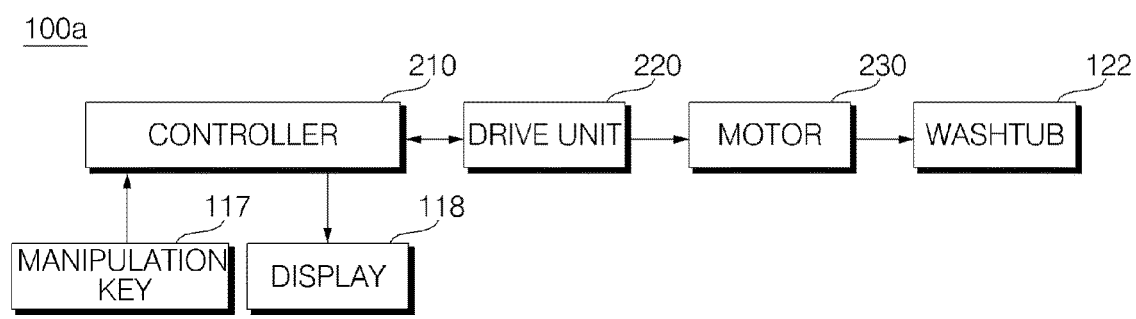
FIG. 12 is an internal block diagram illustrating the laundry treating appliance of FIG. 11.

FIG. 12 is an internal block diagram of the laundry treating appliance of FIG. 11.

Referring to FIG. 12, in the laundry treating appliance 100a, the drive unit 220 is controlled by a controller 210. The drive unit 220 drives the motor 230. Thereby, the washtub 122 is rotated by the motor 230.

The controller 210 operates according to an operation signal received from the manipulation key 117. Thereby, washing, rinsing and drying may be performed.

In addition, the controller 210 may control the display 118 to display a washing mode, a washing time, a drying time, a rinsing time, or the current operation state.

The controller 210 controls the drive unit 220 to operate the motor 230. In this case, a position sensor for sensing the position of the rotor of the motor 230 is not provided to either the interior or the exterior of the motor 230. That is, the drive unit 220 controls the motor 230 in a sensorless manner.

The drive unit 220, which serves to drive the motor 230, may include an inverter, an inverter controller, an output current detector E (see FIG. 3) for detecting an output current flowing through the motor 230, and an output voltage detector F (not shown) for detecting an output voltage vo applied to the motor 230. The drive unit 220 may further include a converter for supplying DC power to be inputted to the inverter (see FIG. 3).

For example, the inverter controller 430 (see FIG. 3) estimates the position of the rotor of the motor 230 based on an output current io and the output voltage vo. Then, the drive unit 220 controls the motor 230 based on the estimated position of the rotor such that the motor 230 rotates.

Specifically, when the inverter controller 430 (see FIG. 3) generates a PWM switching control signal (Sic of FIG. 3) based on the output current io and the output voltage vo and outputs the same to the inverter 420, the inverter 420 supplies AC power of a predetermined frequency to the motor 230. Then, the motor 230 is caused to rotate by the AC power of the predetermined frequency.

The controller 210 may sense the amount of laundry based on, for example, the output current io flowing through the motor 230. For example, while the washtub 122 is rotating, the controller 210 may sense the amount of laundry based on the current value io of the motor 230.

For instance, the controller 210 may accurately sense the amount of laundry using the rotor resistance and inductance of the motor measured in a motor alignment interval.

The controller 210 may sense the degree of maldistribution of the washtub 122, i.e., unbalance (UB) of the washtub 122. Sensing the degree of maldistribution may be performed based on a ripple component of the output current io flowing through the motor 230 or change in the rate of rotation of the washtub 122.

For instance, the controller 210 may accurately sense the amount of laundry using the rotor resistance and inductance of the motor measured in a motor alignment interval.

Figure 13:
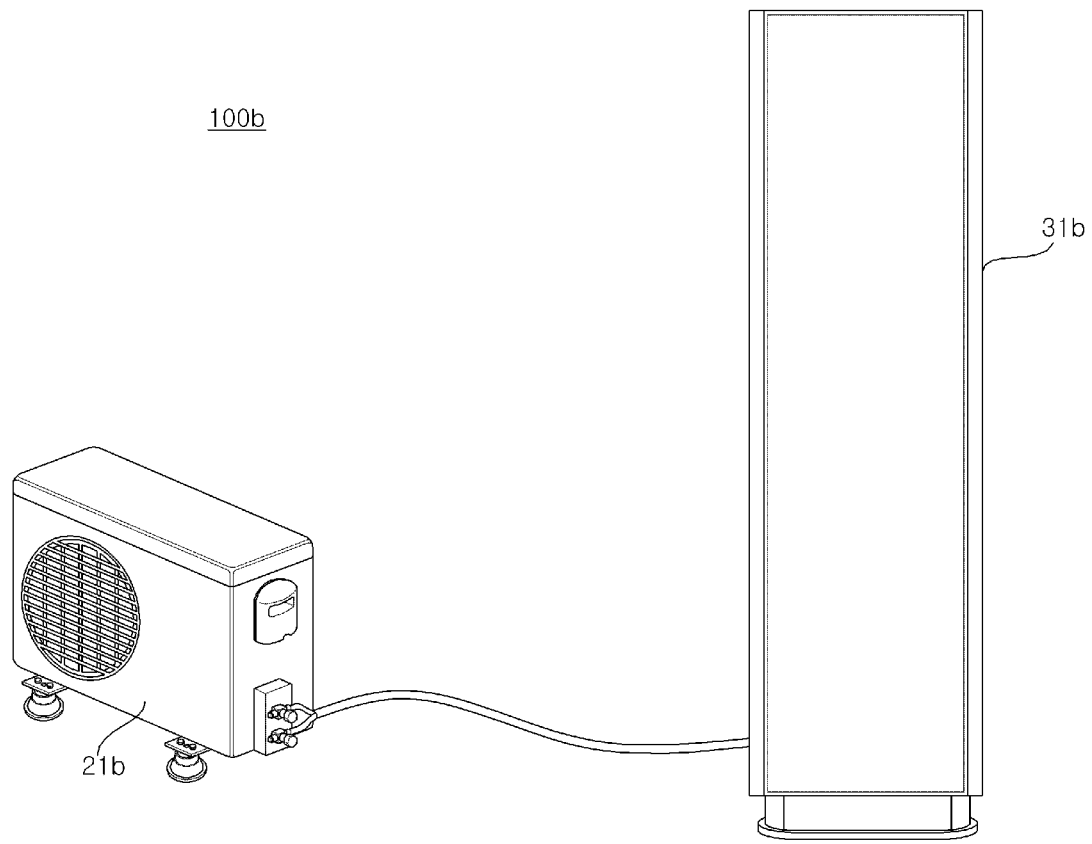
FIG. 13 is a view illustrating configuration of an air conditioner as another exemplary home appliances according to an embodiment of the present invention.

FIG. 13 is a view illustrating configuration of an air conditioner which is another exemplary home appliance according to an embodiment of the present invention.

According to the embodiment, the air conditioner 100b may include an indoor unit 31b and an outdoor unit 21b connected to the indoor unit 31b, as shown in FIG. 13.

As the indoor unit 31b, any one of a standing indoor unit, a wall-mounted indoor unit and a ceiling-mounted indoor unit may be employed. In FIG. 13, the indoor unit 31b is a standing indoor unit.

The air conditioner 100b may further include at least one of a ventilator, an air cleaner, a humidifier and a heater, which may operate in connection with operations of the indoor unit and the outdoor unit.

Figure 14:
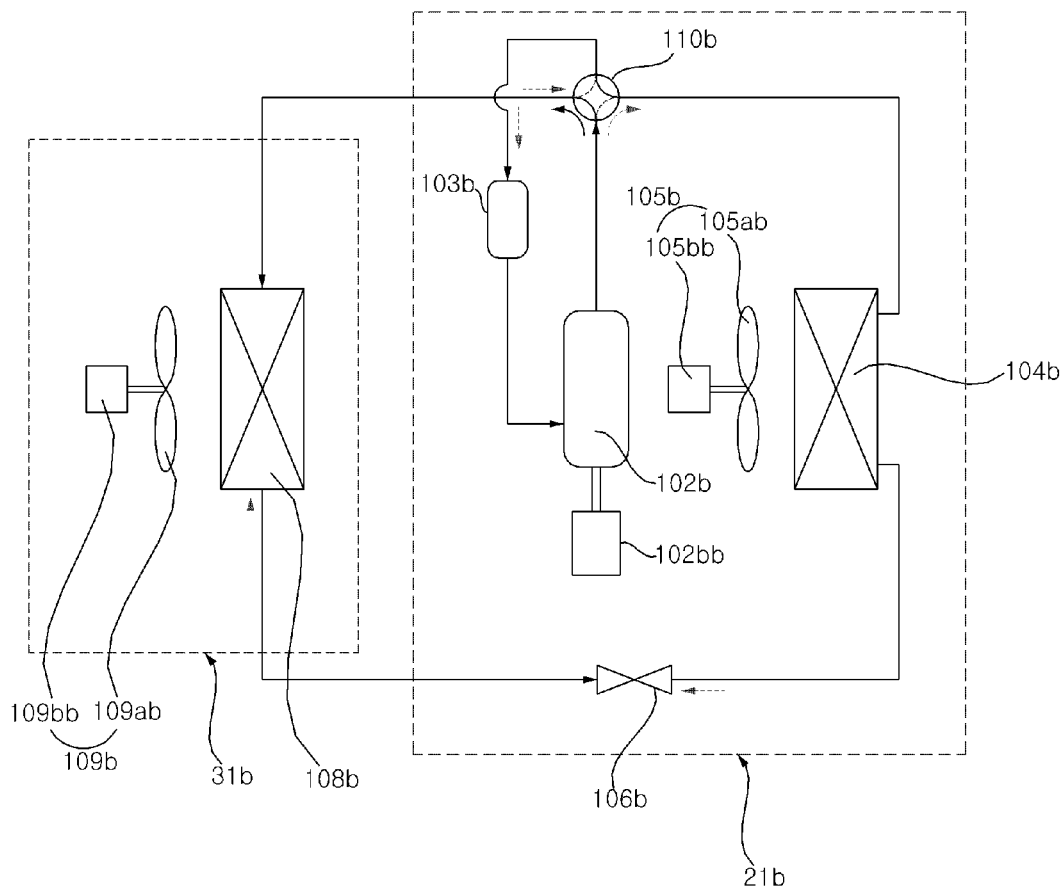
FIG. 14 is a schematic diagram illustrating the outdoor unit and the indoor unit of FIG. 13.

The outdoor unit 21b includes a compressor for compressing a refrigerant supplied thereto, an outdoor heat exchanger causing heat exchange between the refrigerant and the outdoor air, an accumulator for extracting a gaseous refrigerant from the supplied refrigerant and supplying the same to the compressor, and a 4-way valve for selecting a flow path of the refrigerant according to the heating operation (see FIG. 14). The outdoor unit 21b further includes a plurality of sensors, a valve and an oil collector, which will not be described below.

The outdoor unit 21b operates the compressor and the outdoor heat exchanger provided to the outdoor unit 21b to compress the refrigerant or cause heat exchange according to the settings to supply the refrigerant to the indoor unit 31b. The outdoor unit 21b may be driven by a remote controller (not shown) or according to a request from the indoor unit 31b. As the cooling/heating capacity depends on the indoor unit, the number of operations of the outdoor unit and the number of operations of the compressor installed in the outdoor unit are changeable.

The outdoor unit 21b supplies the compressed refrigerant to the indoor unit 31b connected thereto.

The indoor unit 31b receives the refrigerant from the outdoor unit 21b and discharges cooled air to the indoor space. The indoor unit 31b includes an indoor heat exchanger (not shown), an indoor unit fan, an expansion valve (not shown) for expanding the supplied refrigerant, and multiple sensors (not shown).

The outdoor unit 21b and the indoor unit 31b are connected through a communication line to exchange data. The outdoor unit and the indoor unit may be connected to a remote control (not shown) by wire or wirelessly. Thereby, operations of the outdoor unit and the indoor unit may be controlled by the remote control (not shown).

The remote control (not shown) is connected to the indoor unit 31b to input a control command of the user to the indoor unit. The remote control may receive and display the state information about the indoor unit. The remote control may communicate with the indoor unit by wire or wirelessly.

FIG. 14 is a schematic diagram illustrating the outdoor unit and the indoor unit of FIG. 13.

Referring to FIG. 14, the air conditioner 100b is broadly divided into the indoor unit 31b and the outdoor unit 21b.

The outdoor unit 21b includes a compressor 102b serving to compress the refrigerant, a compressor motor 102bb for driving the compressor, an outdoor heat exchanger 104b serving to dissipate heat from the compressed refrigerant, an outdoor air blower 105b including an outdoor fan 105ab disposed on one side of the outdoor heat exchanger 104b to support heat dissipation from the refrigerant and a motor 105bb for rotating the outdoor fan 105ab, an expansion mechanism 106b for expanding the condensed refrigerant, a cooling/heating switching valve 110b for switching between flow paths of the compressed refrigerant, and an accumulator 103b for temporarily storing the evaporated refrigerant, removing moisture and foreign substances from the stored refrigerant, and then supplying the refrigerant of a constant pressure to the accumulator 103b.

The indoor unit 31b includes an indoor heat exchanger 109b disposed in the indoor space to perform the cooling/heating functions and an indoor air blower 109b including an indoor fan 109ab disposed on one side of the indoor heat exchanger 109b to support heat dissipation from the refrigerant and a motor 109bb for rotating the indoor fan 109ab.

At least one indoor heat exchanger 109b may be installed. As for the compressor 102b, at least one of an inverter compressor and a constant speed compressor may be employed.

The air conditioner 100b may be configured as an air cooler for cooling the indoor space or as a heat pump for cooling or heating the indoor space.

The compressor 102b in the outdoor unit 21b of FIG. 14 may be driven by a motor driving apparatus for driving the compressor motor 102bb, such as the motor driving apparatus 220 of FIG. 1.

Alternatively, the indoor fan 109ab or the outdoor fan 105ab may be driven by a motor driving apparatus for driving the indoor fan motor 109ab or the outdoor fan motor 105ab, such as the motor driving apparatus 220 of FIG. 1.

Figure 15:
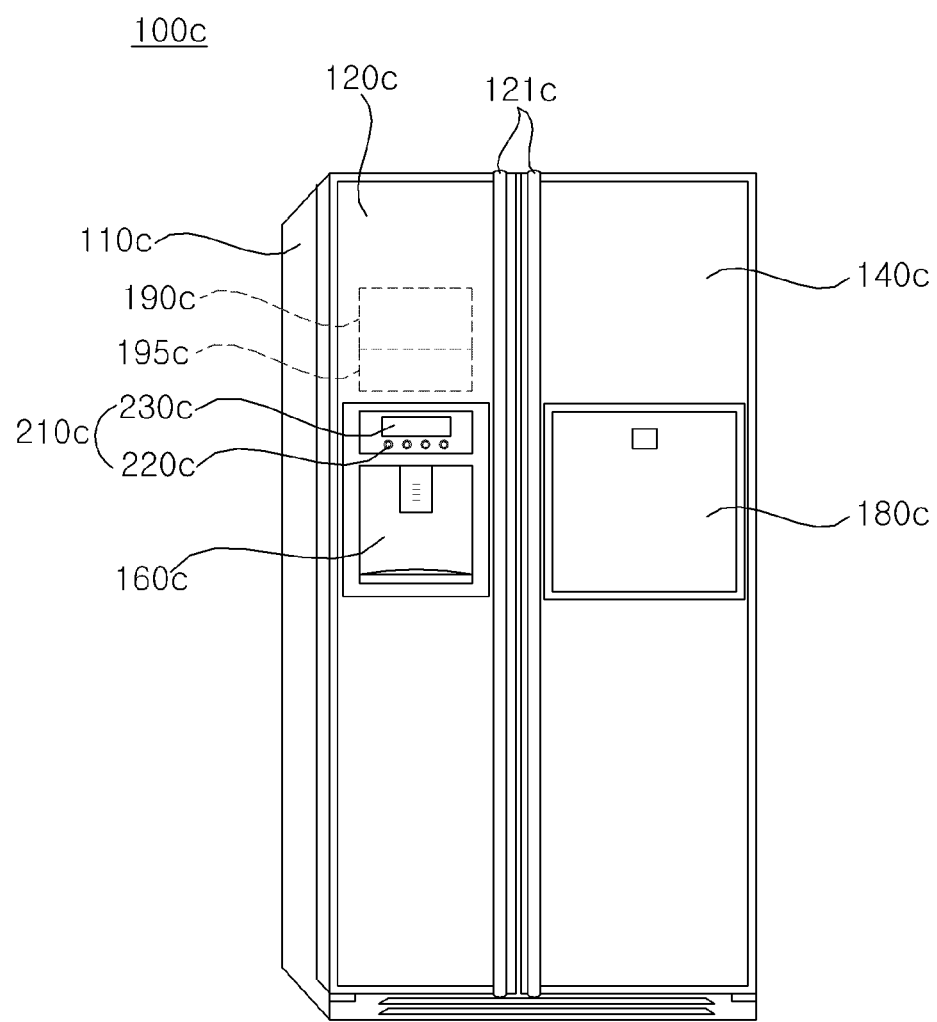
FIG. 15 is a perspective view illustrating a refrigerator as another exemplary home appliance according to an embodiment of the present invention.

FIG. 15 is a perspective view illustrating a refrigerator which is another exemplary home appliance according to an embodiment of the present invention.

Referring to FIG. 15, the overall exterior of a refrigerator 100c related to the embodiment is defined by a case 110c having an inner space partitioned into a freezer compartment and a cooling compartment, which are not shown, a freezer compartment door 120c for shielding the freezer compartment, and a cooling compartment door 140c for shielding the cooling compartment.

The front surfaces of the freezer compartment door 120c and the cooling compartment door 140c are provided with door handles 121c protruding forward such that a user can easily grip the door handles 121c to rotate the freezer compartment door 120c and the cooling compartment door 140c, respectively.

The front surface of the cooling compartment door 140c may be further provided with a home bar 180c, which is a convenience means allowing the user to take out a stored item such as a beverage without opening the cooling compartment door 140c.

The front surface of the freezer compartment door 120c may be further provided with a dispenser 160c, which is a convenience means allowing the user to take out ice or drink water without opening the freezer compartment door 120c. A control panel 210c for controlling operation of the refrigerator 100c and displaying the operation state of the refrigerator 100c may be provided on the upper side of the dispenser 160c.

While the dispenser 160c is illustrated as being disposed on the front surface of the freezer compartment door 120c, embodiments of the present invention are not limited thereto. The dispenser 160c may be disposed on the front surface of the cooling compartment door 140c.

Meanwhile, the inner upper portion of the freezer compartment (not shown) may be provided with an icemaker 190c for making ice out of the supplied water using cold air in the freezer compartment and an ice bank 195c installed inside the freezer compartment (not shown) to contain separated ice cubes made by the icemaker. Although not shown in the figure, an ice chute (not shown) for guiding ice falling from the ice bank 195c into the dispenser 160c may be further provided.

The control panel 210c may include an input unit 220c comprising multiple buttons and a display unit 230c for displaying a control screen and an operation state.

The display unit 230c displays a control screen, an operation state and information such as a temperature in the refrigerator. For example, the display unit 230c may display a service mode (ice cubes, water, crushed ice) of the dispenser, a set temperature of the freezer compartment, and a set temperature of the cooling compartment.

The display unit 230c may be implemented as, for example, a liquid crystal display (LCD), light emitting diodes (LEDs), and organic light emitting diodes (OLEDs). The display unit 230c may also be implemented as a touchscreen capable of performing the function of the input unit 220c.

The input unit 220c may be provided with multiple manipulation buttons. For example, the input unit 220c may include a dispenser setting button (not shown) for setting a service mode (ice cubes, water, chipped ice, etc.) of the dispenser, a freezer compartment temperature setting button (not shown) for setting the temperature of the freezer compartment, a cooling compartment temperature setting button (not shown) for setting the temperature of the cooling compartment. The input unit 220c may be implemented by a touchscreen capable of performing the function of the display unit 230c.

The refrigerator according to embodiments of the present invention is not limited to the illustrated double door type refrigerator. The refrigerator may be of any type of refrigerator including one door type, sliding door type, and curtain door type.

Figure 16:
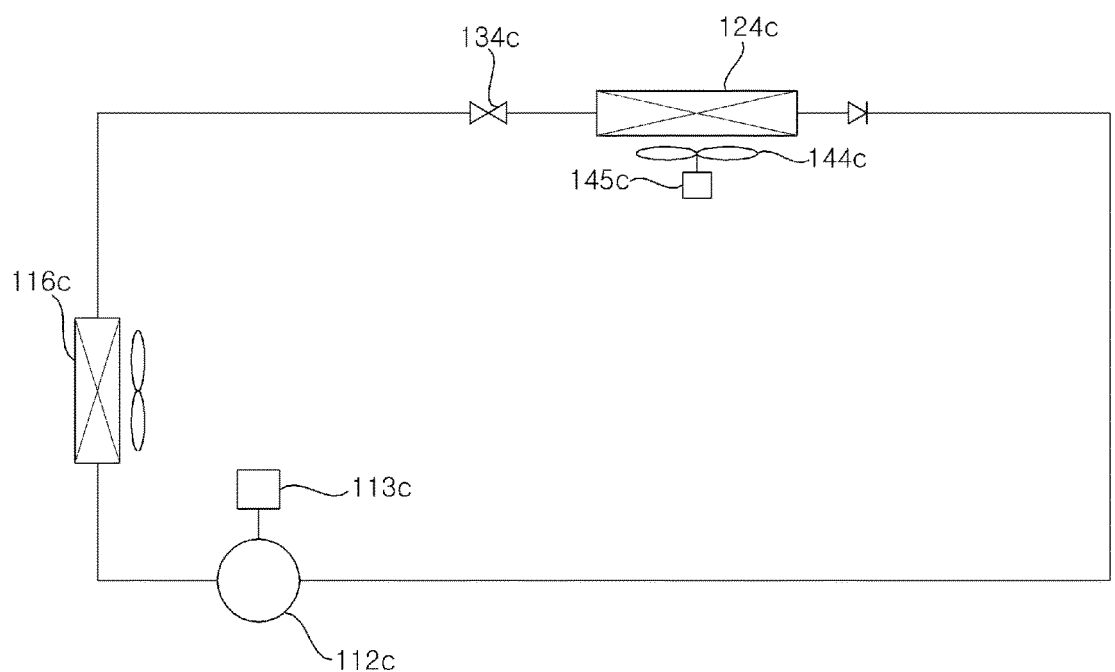
FIG. 16 is a view schematically illustrating configuration of the refrigerator of FIG. 15.

FIG. 16 is a diagram schematically illustrating configuration of the refrigerator of FIG. 15.

Referring to FIG. 16, the refrigerator 100c may include a compressor 112c, a condenser 116c for condensing a refrigerant compressed by the compressor 112c, a freezer compartment evaporator 124c disposed on the freezer compartment (not shown) to evaporate the condensed refrigerant supplied from the condenser 116c, and a freezer compartment expansion valve 134c for expanding the refrigerant supplied from the freezer compartment evaporator 124c.

While FIG. 16 illustrates that one evaporator is used, each of the cooling compartment and the freezer compartment may employ an evaporator.

That is, the refrigerator 100c may further include a cooling compartment evaporator (not shown) disposed on the cooling compartment (not shown), a 3-way valve (not shown) for supplying the refrigerant condensed by the condenser 116c to the cooling compartment evaporator (not shown) or the freezer compartment evaporator 124c, and a cooling compartment expansion valve (not shown) for expanding the refrigerant supplied to the cooling compartment evaporator (not shown).

The refrigerator 100c may further include a liquid-gas separator (not shown) in which the refrigerant from the evaporator 124c is separated into liquid and gas.

The refrigerator 100c may further include a cooling compartment fan (not shown) and a freezer compartment fan 144c, which suction cold air arriving via the freezer compartment evaporator 124c and supply the same to the cooling compartment (not shown) and the freezer compartment (not shown).

The refrigerator 100c may further include a compressor drive unit 113c for driving the compressor 112c, a cooling compartment drive unit (not shown) for driving the cooling compartment fan (not shown), and a freezer compartment fan drive unit 145c for driving the freezer compartment fan 144c.

Referring to FIG. 16, the evaporator 124c is used for both the cooling compartment and the freezer compartment. In this case, a damper (not shown) may be installed between the cooling compartment and the freezer compartment, and a fan (not shown) may forcibly blow the air cooled by the evaporator to the freezer compartment and the cooling compartment.

The compressor 112c of FIG. 16 may be driven by a motor driving apparatus for driving the compressor motor, such as the motor driving apparatus 220 of FIG. 1.

Alternatively, the cooling compartment fan (not shown) or the freezer compartment fan 144c may be driven by a motor driving apparatus for driving the cooling compartment fan motor (not shown) or the freezer compartment fan motor 144c, such as the motor driving apparatus 220 of FIG. 1.

A mobile terminal and a home appliance according to embodiments of the present invention are not limited to configurations and methods of the embodiments described above. Variations may be made to the embodiments described above by selectively combining all or some of the embodiments.

A motor driving method and a method for operating a home appliance according to embodiments of the present invention are implementable by processor-readable code on a recording medium which can be read by a processor provided to the motor driving apparatus or home appliance. The recording medium readable by the processor includes all kinds of recording devices for storing data which can be read by the processor.

As is apparent from the above description, embodiments of the present invention may have the following effects.

According to an embodiment of the present invention, a mobile terminal includes a display, a communication unit, a microphone, and a controller configured to perform a control operation to transmit a request for management data to a home appliance through the communication unit according to a management mode input and to display a management data screen on the display based on first sound acquired from the home appliance, and perform a control operation to transmit a request for diagnostic data to the home appliance through the communication unit according to a diagnosis mode input and to display a diagnostic data screen on the display based on second sound acquired from the home appliance. Thereby, the management data screen and diagnostic data screen may be easily displayed based on the sound output from the home appliance.

In particular, when a management mode item is selected in the home appliance-related screen with a home appliance-related screen displayed based on a user input, the controller controls the request for management data to be transmitted to the home appliance. And when a diagnosis mode item is selected in the home appliance-related screen, the controller controls the request for diagnostic data to be transmitted to the home appliance. Thereby, the first sound corresponding to the management data and second sound corresponding to the diagnostic data may be acquired from the home appliance. Accordingly, desired data screens may be easily displayed.

Meanwhile, when a server connection item is selected in the home appliance-related screen, the mobile terminal connects to a server to display a service screen provided from the server. Thereby, various kinds of service information provided from the server may be displayed.

According to an embodiment of the present invention, a home appliance includes a memory to store diagnostic data, a communication unit to exchange data with a mobile terminal, a sound output unit, a controller to control the sound output unit to output first sound corresponding to management data when a request for the management data is received by the communication unit and to output second sound corresponding to diagnostic data when a request for the diagnostic data is received by the communication unit. Thereby, the management data and diagnostic data may be easily outputted.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A home appliance comprising:
a memory to store diagnostic data;
a communication unit to exchange data with a mobile terminal;
a sound output unit;
a controller to control the sound output unit to output first sound corresponding to management data when a request for the management data is received by the communication unit and to output second sound corresponding to diagnostic data when a request for the diagnostic data is received by the communication unit, wherein the controller is configured to:

calculate a distance to the mobile terminal based on an intensity of a signal received from the mobile terminal through the communication unit; and change a volume or frequency of the first sound or second sound to be outputted or an amount of data added to the sound, based on the calculated distance, wherein the controller controls sound corresponding to a first amount of data to be outputted when the distance to the mobile terminal is a first distance and controls sound corresponding to a second amount of data to be outputted when the distance to the mobile terminal is a second distance, the second amount of data being larger than the first amount of data and the second distance being greater than the first distance.

2. The home appliance according to claim 1, wherein the management data contains power consumption information, recommended operation information, current operation information and product management information, wherein the diagnostic data contains error occurrence information, error information, temperature information, and one of discharge temperature information about a compressor, outdoor fan speed information, indoor fan operation mode information, information about an electrical current in a drive unit, and voltage information.

3. The home appliance according to claim 1, wherein the controller controls operation information and state information to be stored in the memory periodically and temporarily and performs a control operation to store, when an error occurs, operation information and state information in the memory among the periodically and temporarily stored operation information and state information, wherein, the controller performs a control operation to:
store, in the memory, operation information given at the time of occurrence of the error; and
store operation information and state information given a predetermined time after occurrence of the error.

4. The home appliance according to claim 1, wherein the sound output unit comprises:

an inverter comprising a plurality of switching devices, the inverter being configured to convert a direct current (DC) power into an alternating current (AC) power according to switching of the switching devices and to supply the AC power to a motor;

wherein the controller performs a control operation to change a switching frequency of the respective switching devices of the inverter to output sound corresponding to the changed switching frequency.

5. The home appliance according to claim 4, wherein the controller performs a control operation to change a level or frequency of a current flowing through the motor to change a volume or frequency of the sound.

6. The home appliance according to claim 1, wherein the sound output unit comprises:

a frequency transformer to transform a frequency of an audio signal to be outputted;

a data insertion unit to insert the diagnostic data into a frequency-transformed audio signal;

an inverse transformer to inversely transform the audio signal containing the diagnostic data; and a multiplexer to multiplex the inversely transformed audio signal, wherein the sound output unit outputs sound corresponding to the multiplexed audio signal.

7. The home appliance according to claim 1, wherein the controller controls sound of first volume to be outputted when the distance to the mobile terminal is a first distance, and controls sound of second volume to be outputted when the distance to the mobile terminal is a second distance, the second volume being louder than the first volume and the second distance being greater than the first distance.

8. The home appliance according to claim 1, wherein the controller controls sound of first frequency to be outputted when the distance to the mobile terminal is a first distance, and controls sound of second frequency to be outputted when the distance to the mobile terminal is a second distance, the second frequency being higher than the first frequency and the second distance being greater than the first distance.

* * * * *